United States Patent
Shukla et al.

(10) Patent No.: US 10,392,000 B2
(45) Date of Patent: *Aug. 27, 2019

(54) VEHICLE DRIVE AND METHOD WITH ELECTROMECHANICAL VARIABLE TRANSMISSION

(71) Applicant: Oshkosh Defense, LLC, Oshkosh, WI (US)

(72) Inventors: Deepak Shukla, Oshkosh, WI (US); Rongjun Zhang, Oshkosh, WI (US); Nader Nasr, Neenah, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,178

(22) Filed: Nov. 20, 2017

(65) Prior Publication Data

US 2018/0072303 A1 Mar. 15, 2018

Related U.S. Application Data

(63) Continuation of application No. 15/186,391, filed on Jun. 17, 2016, now Pat. No. 9,821,789, which is a (Continued)

(51) Int. Cl.
*B60W 20/10* (2016.01)
*F16H 1/28* (2006.01)
(Continued)

(52) U.S. Cl.
CPC ............... *B60W 20/10* (2013.01); *B60K 6/26* (2013.01); *B60K 6/34* (2013.01); *B60K 6/365* (2013.01);
(Continued)

(58) Field of Classification Search
CPC . B60K 6/26; B60K 6/34; B60K 6/365; B60K 6/387; B60K 6/445; B60K 6/52; B60K 6/543; B60L 11/04
See application file for complete search history.

(56) References Cited

U.S. PATENT DOCUMENTS 1,951,089 A 3/1934 Fielder
3,524,069 A 8/1970 Stepanov et al.
(Continued)

FOREIGN PATENT DOCUMENTS

CN 101323243 A 12/2008
DE 18 16 183 6/1970
(Continued)

OTHER PUBLICATIONS

US 7,154,246 B1, 12/2006, Heap (withdrawn)
(Continued)

*Primary Examiner* — Tyler J Lee
(74) *Attorney, Agent, or Firm* — Foley & Lardner LLP

(57) ABSTRACT

A vehicle drive includes a gear set, a first motor/generator coupled to the gear set, a second motor/generator at least selectively rotationally engaged with the gear set, an engine at least selectively coupled to the gear set and selectively coupled to the second motor/generator, and a clutch configured to selectively engage the second motor/generator to the engine. The first motor/generator and the second motor/generator are electrically coupled without an energy storage device configured to at least one of (a) provide electrical energy to the first motor/generator or the second motor/generator to power the first motor/generator or the second motor/generator and (b) be charged by electrical energy from the first motor/generator or the second motor/generator.

18 Claims, 18 Drawing Sheets

Related U.S. Application Data continuation of application No. 14/813,032, filed on Jul. 29, 2015, now Pat. No. 9,376,102, which is a continuation of application No. 14/155,145, filed on Jan. 14, 2014, now Pat. No. 9,114,804.

(60) Provisional application No. 61/783,132, filed on Mar. 14, 2013, provisional application No. 61/785,479, filed on Mar. 14, 2013.

(51) Int. Cl.
| | | |
|---|---|---|
| F16H 3/72 | (2006.01) | |
| B60W 10/08 | (2006.01) | |
| B60K 6/365 | (2007.10) | |
| B60K 6/34 | (2007.10) | |
| B60K 6/26 | (2007.10) | |
| B60K 6/445 | (2007.10) | |
| B60W 10/02 | (2006.01) | |
| B60W 10/06 | (2006.01) | |
| B60K 6/387 | (2007.10) | |
| B60K 6/52 | (2007.10) | |
| B60K 6/543 | (2007.10) | |
| B60L 50/11 | (2019.01) | |

(52) U.S. Cl.
CPC ............. *B60K 6/387* (2013.01); *B60K 6/445* (2013.01); *B60K 6/52* (2013.01); *B60K 6/543* (2013.01); *B60L 50/11* (2019.02); *B60W 10/02* (2013.01); *B60W 10/06* (2013.01); *B60W 10/08* (2013.01); *F16H 1/28* (2013.01); *F16H 3/72* (2013.01); *F16H 3/727* (2013.01); *F16H 3/728* (2013.01); *B60W 2510/06* (2013.01); *B60W 2510/0604* (2013.01); *B60W 2510/0638* (2013.01); *B60W 2510/08* (2013.01); *B60W 2510/081* (2013.01); *B60W 2520/10* (2013.01); *B60W 2710/021* (2013.01); *B60W 2710/06* (2013.01); *B60W 2710/0644* (2013.01); *B60W 2710/0677* (2013.01); *B60W 2710/08* (2013.01); *B60W 2710/083* (2013.01); *B60Y 2200/92* (2013.01); *B60Y 2300/42* (2013.01); *B60Y 2300/43* (2013.01); *B60Y 2300/60* (2013.01); *B60Y 2400/72* (2013.01); *B60Y 2400/73* (2013.01); *Y02T 10/6239* (2013.01); *Y02T 10/6286* (2013.01); *Y02T 10/92* (2013.01); *Y10S 903/906* (2013.01); *Y10S 903/91* (2013.01); *Y10S 903/914* (2013.01); *Y10S 903/916* (2013.01); *Y10S 903/918* (2013.01); *Y10S 903/93* (2013.01)

(56) References Cited

U.S. PATENT DOCUMENTS

| | | |
|---|---|---|
| 3,690,559 A | 9/1972 | Rudloff |
| 3,764,867 A | 10/1973 | Smi |
| 3,799,284 A | 3/1974 | Hender |
| 3,865,209 A | 2/1975 | Aihara et al. |
| 3,966,067 A | 6/1976 | Reese |
| 4,021,704 A | 5/1977 | Norbeck |
| 4,088,934 A | 5/1978 | D'Atre et al. |
| 4,097,925 A | 6/1978 | Butler, Jr. |
| 4,113,045 A | 9/1978 | Downing, Jr. |
| 4,196,785 A | 4/1980 | Downing, Jr. |
| 4,292,531 A | 9/1981 | Williamson |
| 4,319,140 A | 3/1982 | Paschke |
| 4,336,418 A | 6/1982 | Hoag |
| 4,347,907 A | 9/1982 | Downing, Jr. |
| 4,411,171 A | 10/1983 | Fiala |
| 4,423,362 A | 12/1983 | Konrad et al. |
| 4,423,794 A | 1/1984 | Beck |
| 4,444,285 A | 4/1984 | Stewart et al. |
| 4,461,988 A | 7/1984 | Plunkett |
| 4,533,011 A | 8/1985 | Heidemeyer et al. |
| 4,562,894 A | 1/1986 | Yang |
| 4,719,361 A | 1/1988 | Brubaker |
| 4,760,275 A | 7/1988 | Sato et al. |
| 4,774,399 A | 9/1988 | Fujita et al. |
| 4,774,811 A | 10/1988 | Kawamura |
| 4,809,177 A | 2/1989 | Windle et al. |
| 4,953,646 A | 9/1990 | Kim |
| 4,966,242 A | 10/1990 | Baillargeon |
| 4,985,845 A | 1/1991 | Goetz et al. |
| 5,067,932 A | 11/1991 | Edwards |
| 5,081,832 A | 1/1992 | Mowill |
| 5,120,282 A | 6/1992 | Fjaellstroem |
| 5,168,946 A | 12/1992 | Dorgan |
| 5,180,456 A | 1/1993 | Schultz et al. |
| 5,195,600 A | 3/1993 | Dorgan |
| 5,201,629 A | 4/1993 | Simpson et al. |
| 5,227,703 A | 7/1993 | Boothe et al. |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,343,971 A | 9/1994 | Heidelberg et al. |
| 5,345,154 A | 9/1994 | King |
| 5,369,540 A | 11/1994 | Konrad et al. |
| 5,389,825 A | 2/1995 | Ishikawa et al. |
| 5,409,425 A | 4/1995 | Shibahata |
| 5,418,437 A | 5/1995 | Couture et al. |
| 5,448,561 A | 9/1995 | Kaiser et al. |
| 5,504,655 A | 4/1996 | Underwood et al. |
| 5,508,594 A | 4/1996 | Underwood et al. |
| 5,508,689 A | 4/1996 | Rado et al. |
| 5,516,379 A | 5/1996 | Schultz |
| 5,538,274 A | 7/1996 | Schmitz et al. |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,629,567 A | 5/1997 | Kumar |
| 5,629,603 A | 5/1997 | Kinoshita |
| 5,646,510 A | 7/1997 | Kumar |
| 5,669,470 A | 9/1997 | Ross |
| 5,669,842 A | 9/1997 | Schmidt |
| 5,672,920 A | 9/1997 | Donegan et al. |
| 5,679,085 A | 10/1997 | Fredriksen et al. |
| 5,722,502 A | 3/1998 | Kubo |
| 5,767,584 A | 6/1998 | Gore et al. |
| 5,786,640 A | 7/1998 | Sakai et al. |
| 5,789,882 A | 8/1998 | Ibaraki et al. |
| 5,813,487 A | 9/1998 | Lee et al. |
| 5,813,488 A | 9/1998 | Weiss |
| 5,820,150 A | 10/1998 | Archer et al. |
| 5,828,554 A | 10/1998 | Donegan et al. |
| 5,847,520 A | 12/1998 | Theurillat et al. |
| 5,879,265 A | 3/1999 | Bek |
| 5,880,570 A | 3/1999 | Tamaki et al. |
| 5,881,559 A | 3/1999 | Kawamura |
| 5,895,333 A | 4/1999 | Morisawa et al. |
| 5,924,879 A | 7/1999 | Kameyama |
| 5,925,993 A | 7/1999 | Lansberry |
| 5,927,417 A | 7/1999 | Brunner et al. |
| 5,934,395 A | 8/1999 | Koide et al. |
| 5,939,794 A | 8/1999 | Sakai et al. |
| 5,947,855 A | 9/1999 | Weiss |
| 5,957,985 A | 9/1999 | Wong et al. |
| 5,973,463 A | 10/1999 | Okuda et al. |
| 5,980,410 A | 11/1999 | Stemler et al. |
| 5,986,416 A | 11/1999 | Dubois |
| 5,991,683 A | 11/1999 | Takaoka et al. |
| 5,998,880 A | 12/1999 | Kumar |
| 6,005,358 A | 12/1999 | Radev |
| 6,012,004 A | 1/2000 | Sugano et al. |
| 6,028,403 A | 2/2000 | Fukatsu |

(56) References Cited

U.S. PATENT DOCUMENTS

| | | | |
|---|---|---|---|
| 6,038,500 A | 3/2000 | Weiss | |
| 6,054,844 A | 4/2000 | Frank | |
| 6,104,148 A | 8/2000 | Kumar et al. | |
| 6,105,984 A | 8/2000 | Schmitz et al. | |
| 6,201,310 B1 | 3/2001 | Adachi et al. | |
| 6,298,932 B1 | 10/2001 | Bowman et al. | |
| 6,356,817 B1 | 3/2002 | Abe | |
| 6,371,878 B1 | 4/2002 | Bowen | |
| 6,387,007 B1 | 5/2002 | Fini, Jr. | |
| 6,404,607 B1 | 6/2002 | Burgess et al. | |
| 6,421,593 B1 | 7/2002 | Kempen et al. | |
| 6,434,470 B1 | 8/2002 | Nantz et al. | |
| 6,478,705 B1 | 11/2002 | Holmes et al. | |
| 6,496,393 B1 | 12/2002 | Patwardhan | |
| 6,501,368 B1 | 12/2002 | Wiebe et al. | |
| 6,553,287 B1 | 4/2003 | Supina et al. | |
| 6,553,290 B1 | 4/2003 | Pillar | |
| 6,563,230 B2 | 5/2003 | Nada | |
| 6,575,866 B2 | 6/2003 | Bowen | |
| 6,580,953 B1 | 6/2003 | Wiebe et al. | |
| 6,607,466 B2 | 8/2003 | Bordini | |
| 6,611,116 B2 | 8/2003 | Bachman et al. | |
| 6,702,709 B2 | 3/2004 | Bowen | |
| 6,722,458 B2 | 4/2004 | Hofbauer | |
| 6,726,592 B2 | 4/2004 | Kotani | |
| 6,757,597 B2 | 6/2004 | Yakes et al. | |
| 6,793,600 B2 | 9/2004 | Hiraiwa | |
| 6,819,985 B2 | 11/2004 | Minagawa et al. | |
| 6,846,257 B2 | 1/2005 | Baker et al. | |
| 6,852,053 B2 | 2/2005 | Nakano et al. | |
| 6,852,054 B2 | 2/2005 | Tumback et al. | |
| 6,882,917 B2 | 4/2005 | Pillar et al. | |
| 6,885,920 B2 | 4/2005 | Yakes et al. | |
| 6,886,647 B1 | 5/2005 | Gotta | |
| 6,909,944 B2 | 6/2005 | Pillar et al. | |
| 6,922,615 B2 | 7/2005 | Pillar et al. | |
| 6,991,054 B2 | 1/2006 | Takaoka et al. | |
| 6,993,421 B2 | 1/2006 | Pillar et al. | |
| 6,994,646 B2 | 2/2006 | Ai | |
| 7,000,717 B2 | 2/2006 | Ai et al. | |
| 7,004,868 B2 | 2/2006 | Oshidari et al. | |
| 7,006,902 B2 | 2/2006 | Archer et al. | |
| 7,024,296 B2 | 4/2006 | Squires et al. | |
| 7,053,566 B2 | 5/2006 | Aizawa et al. | |
| 7,076,356 B2 | 7/2006 | Hubbard et al. | |
| 7,154,236 B1 | 12/2006 | Heap | |
| 7,179,187 B2 | 2/2007 | Raghavan et al. | |
| 7,196,430 B2 | 3/2007 | Yang | |
| 7,204,776 B2 | 4/2007 | Minagawa et al. | |
| 7,217,211 B2 | 5/2007 | Klemen et al. | |
| 7,219,756 B2 | 5/2007 | Bischoff | |
| 7,223,200 B2 | 5/2007 | Kojima et al. | |
| 7,246,672 B2 | 7/2007 | Shirai et al. | |
| 7,276,007 B2 | 10/2007 | Takami et al. | |
| 7,302,320 B2 | 11/2007 | Nasr et al. | |
| 7,322,896 B2 | 1/2008 | Minagawa | |
| 7,338,401 B2 | 3/2008 | Klemen et al. | |
| 7,357,203 B2 | 4/2008 | Morrow et al. | |
| 7,367,415 B2 | 5/2008 | Oliver et al. | |
| 7,379,797 B2 | 5/2008 | Nasr et al. | |
| 7,467,678 B2 | 12/2008 | Tanaka et al. | |
| 7,479,080 B2 | 1/2009 | Usoro | |
| 7,520,354 B2 | 4/2009 | Morrow et al. | |
| 7,521,814 B2 | 4/2009 | Nasr | |
| 7,527,573 B2 | 5/2009 | Lang et al. | |
| 7,572,201 B2 | 8/2009 | Supina et al. | |
| 7,597,164 B2 | 10/2009 | Severinsky et al. | |
| 7,601,093 B2 | 10/2009 | Tabata et al. | |
| 7,635,039 B2 | 12/2009 | Fujiwara et al. | |
| 7,678,014 B2 | 3/2010 | Nohara et al. | |
| 7,749,131 B2 | 7/2010 | Imamura et al. | |
| 7,811,191 B2 | 10/2010 | Iwase et al. | |
| 7,848,857 B2 | 12/2010 | Nasr et al. | |
| 7,888,894 B2 | 2/2011 | Sugawara et al. | |
| 7,908,063 B2 | 3/2011 | Sah | |
| 7,927,250 B2 | 4/2011 | Imamura et al. | |
| 7,935,021 B2 | 5/2011 | Tabata et al. | |
| 7,935,022 B2 | 5/2011 | Iwase et al. | |
| 7,937,194 B2 | 5/2011 | Nasr et al. | |
| 7,941,259 B2 | 5/2011 | Tabata et al. | |
| 7,942,776 B2 * | 5/2011 | Conlon | B60W 20/10 475/5 |
| 7,972,237 B2 | 7/2011 | Ota | |
| 8,000,850 B2 | 8/2011 | Nasr et al. | |
| 8,007,402 B2 | 8/2011 | Tabata et al. | |
| 8,038,572 B2 | 10/2011 | Matsubara et al. | |
| 8,062,172 B2 | 11/2011 | Supina et al. | |
| 8,091,662 B2 | 1/2012 | Tolksdorf | |
| 8,337,352 B2 | 12/2012 | Morrow et al. | |
| 8,459,619 B2 | 6/2013 | Trinh et al. | |
| 8,561,735 B2 | 10/2013 | Morrow et al. | |
| 8,864,613 B2 | 10/2014 | Morrow et al. | |
| 9,114,804 B1 | 8/2015 | Shukla et al. | |
| 9,132,736 B1 | 9/2015 | Shukla et al. | |
| 2002/0005304 A1 | 1/2002 | Bachman et al. | |
| 2002/0045507 A1 | 4/2002 | Bowen | |
| 2002/0065594 A1 | 5/2002 | Squires et al. | |
| 2003/0130765 A1 | 7/2003 | Pillar et al. | |
| 2003/0158635 A1 | 8/2003 | Pillar et al. | |
| 2003/0163228 A1 | 8/2003 | Pillar et al. | |
| 2003/0163230 A1 | 8/2003 | Pillar et al. | |
| 2003/0171854 A1 | 9/2003 | Pillar et al. | |
| 2003/0195680 A1 | 10/2003 | Pillar | |
| 2003/0200015 A1 | 10/2003 | Pillar | |
| 2003/0230443 A1 | 12/2003 | Cramer et al. | |
| 2004/0019414 A1 | 1/2004 | Pillar et al. | |
| 2004/0024502 A1 | 2/2004 | Squires et al. | |
| 2004/0039510 A1 | 2/2004 | Archer et al. | |
| 2004/0040775 A1 | 3/2004 | Shimizu et al. | |
| 2004/0055802 A1 | 3/2004 | Pillar et al. | |
| 2004/0069865 A1 | 4/2004 | Rowe et al. | |
| 2004/0133319 A1 | 7/2004 | Pillar et al. | |
| 2004/0133332 A1 | 7/2004 | Yakes et al. | |
| 2004/0199302 A1 | 10/2004 | Pillar et al. | |
| 2005/0004733 A1 | 1/2005 | Pillar et al. | |
| 2005/0038934 A1 | 2/2005 | Gotze et al. | |
| 2005/0113988 A1 | 5/2005 | Nasr et al. | |
| 2005/0113996 A1 | 5/2005 | Pillar et al. | |
| 2005/0114007 A1 | 5/2005 | Pillar et al. | |
| 2005/0119806 A1 | 6/2005 | Nasr et al. | |
| 2005/0131600 A1 | 6/2005 | Quigley et al. | |
| 2005/0137042 A1 | 6/2005 | Schmidt et al. | |
| 2005/0209747 A1 | 9/2005 | Yakes et al. | |
| 2005/0234622 A1 | 10/2005 | Pillar et al. | |
| 2007/0105678 A1 | 5/2007 | Bucknor et al. | |
| 2007/0275808 A1 | 11/2007 | Iwanaka et al. | |
| 2008/0200296 A1 | 8/2008 | Holmes | |
| 2008/0234087 A1 | 9/2008 | Besnard et al. | |
| 2009/0054202 A1 | 2/2009 | Yamakado et al. | |
| 2009/0176610 A1 * | 7/2009 | Conlon | B60W 20/10 475/5 |
| 2009/0194347 A1 | 8/2009 | Morrow et al. | |
| 2009/0209381 A1 | 8/2009 | Ai et al. | |
| 2009/0221390 A1 | 9/2009 | Houle | |
| 2009/0227409 A1 | 9/2009 | Ito et al. | |
| 2009/0227417 A1 | 9/2009 | Imamura et al. | |
| 2010/0029428 A1 | 2/2010 | Abe et al. | |
| 2010/0051361 A1 | 3/2010 | Katsuta et al. | |
| 2010/0051367 A1 | 3/2010 | Yamada et al. | |
| 2010/0070008 A1 | 3/2010 | Parker et al. | |
| 2010/0120579 A1 | 5/2010 | Kawasaki | |
| 2010/0138086 A1 | 6/2010 | Imamura et al. | |
| 2010/0145589 A1 | 6/2010 | Kobayashi | |
| 2010/0227722 A1 | 9/2010 | Conlon | |
| 2010/0261565 A1 | 10/2010 | Ai et al. | |
| 2010/0326752 A1 | 12/2010 | Lamperth | |
| 2011/0127095 A1 | 6/2011 | Imamura et al. | |
| 2011/0130234 A1 | 6/2011 | Phillips | |
| 2011/0312459 A1 | 12/2011 | Morrow et al. | |
| 2012/0022737 A1 | 1/2012 | Kumazaki et al. | |
| 2012/0226401 A1 | 9/2012 | Naito | |
| 2013/0196806 A1 | 8/2013 | Morrow et al. | |

(56) References Cited

U.S. PATENT DOCUMENTS

| | | |
|---|---|---|
| 2014/0136035 A1 | 5/2014 | Boskovitch et al. |
| 2014/0235394 A1 | 8/2014 | Smetana et al. |
| 2014/0288756 A1 | 9/2014 | Tanaka et al. |

FOREIGN PATENT DOCUMENTS

| | | |
|---|---|---|
| DE | 41 08 647 A1 | 9/1992 |
| DE | 41 34 160 A1 | 4/1993 |
| DE | 44 31 929 C1 | 10/1995 |
| DE | 19749074 A1 | 5/1999 |
| DE | 19851436 A1 | 5/2000 |
| EP | 0 791 506 A2 | 8/1997 |
| EP | 0 622 264 B1 | 11/1998 |
| EP | 0 898 213 A1 | 2/1999 |
| EP | 0 925 981 A2 | 6/1999 |
| EP | 1 018 451 A1 | 7/2000 |
| EP | 0 805 059 B1 | 8/2000 |
| EP | 1 092 406 A2 | 4/2001 |
| EP | 0 564 943 B1 | 6/2001 |
| EP | 1 142 744 A1 | 10/2001 |
| EP | 0 812 720 B1 | 12/2001 |
| EP | 1 229 636 A2 | 8/2002 |
| EP | 0 937 600 B1 | 12/2005 |
| FR | 2658259 A1 | 8/1991 |
| GB | 1 308 318 | 2/1973 |
| GB | 2 302 850 A | 2/1997 |
| JP | 60-216703 A | 10/1985 |
| JP | 2010-070008 A | 4/2010 |
| WO | WO-98/19875 A1 | 5/1998 |
| WO | WO-00/30235 A1 | 5/2000 |
| WO | WO-01/54939 A2 | 8/2001 |
| WO | WO-03/055714 A1 | 7/2003 |
| WO | WO-03/093046 A2 | 11/2003 |

OTHER PUBLICATIONS

Bose, et al., "High Frequency AC vs. DC Distribution System for Next Generation Hybrid Electric Vehicle," Industrial Electronics, Control and Instrumentation, Proceedings of the 1996 IEEE IECON 22nd International Conference on Taipei, Taiwan, New York, New York, pp. 706-712 Aug. 5-10, 1996.

European Search Report based on European Application No. EP 0724300, dated Jul. 4, 2005, 2 pages.

Dana Spicer Central Tire Inflation System Specifications, Dana Corporation, Kalamazoo, Michigan, 2 pages, May 2000.

Diesel Locomotive Technology, http://www.railway-technical.com/diesel.shtml, available by Jan. 24, 2012, 15 pages.

Invitation to Pay Additional Fees regarding International Application No. PCT/US2011/041089, dated Sep. 6, 2011, 5 pages.

Khan, I.A., Automotive Electrical Systems: Architecture and Components, Digital Avionics Systems Conference, IEEE, pp. 8.C.5-1-8.C.5-10, 1999.

Miller, Hybrid Electric Vehicle Propulsion System Architectures of the e-CVT Type, IEEE Transactions on Power Electronics, vol. 21, No. 3, May 2006, 12 pages.

Namuduri, et al., High Power Density Electric Drive for an Hybrid Vehicle, Applied Power Electronics Conference and Exposition, pp. 34-40, Feb. 15, 1998.

Rajashekara, K., History of Electric Vehicles in General Motors, Industry Applications Society Annual Meeting, pp. 447-454, Oct. 2-8, 1993.

Shigley et al., Theory of Machines and Mechanisms, complete text, McGraw-Hill Book Company, published in the United States, 297 pages, 1980.

\* cited by examiner

| | Output-coupled (low speed) | Transition between OC and IC | Input-coupled (high speed) |
|---|---|---|---|
| EM1 | Voltage mode | Voltage mode | Torque mode |
| EM2 | Torque mode | Torque mode | Voltage mode |
| Engine | Speed mode | | |

| Transmission State | Operation of Torque Machine | Operation of Voltage Machine | Condition |
|---|---|---|---|
| OC Mode, Acceleration | EM2 Motors | EM1 Generates | |
| OC Mode (e.g., rolling backwards) | EM2 Generates | EM1 Motors | EM2 power > losses |
| | | EM1 Generates | EM2 power <= losses |
| IC Mode | EM1 Motors | EM2 Generates | |
| IC Mode | EM1 Generates | EM2 Motors | EM1 power > losses |
| | | EM2 Generates | EM1 power <= losses |

FIG. 12

VEHICLE DRIVE AND METHOD WITH ELECTROMECHANICAL VARIABLE TRANSMISSION

CROSS-REFERENCE TO RELATED PATENT APPLICATIONS

This application is a continuation of U.S. application Ser. No. 15/186,391, filed Jun. 17, 2016, which is a continuation of U.S. application Ser. No. 14/813,032, filed Jul. 29, 2015, which is a continuation of U.S. application Ser. No. 14/155,145, filed Jan. 14, 2014, which claims the benefit of U.S. Provisional Patent Application Nos. 61/783,132, filed Mar. 14, 2013, and 61/785,479, filed Mar. 14, 2013, all of which are incorporated herein by reference in their entireties.

STATEMENT REGARDING FEDERALLY-SPONSORED RESEARCH OR DEVELOPMENT

This invention was made with Government support under Contract No. N00014-09-C-0061 awarded by the Office of Naval Research. The Government has certain rights in this invention.

BACKGROUND

The present disclosure relates generally to the field of transmissions for vehicles. More specifically, the present disclosure relates to the field of electromechanical infinitely variable transmissions for vehicles.

SUMMARY

One exemplary embodiment relates to a vehicle drive that includes a gear set having a sun gear, a ring gear, and planetary gears, the planetary gears coupling the sun gear to the ring gear, and the planetary gears rotatably supported by a planetary gear carrier. The vehicle drive further includes a first motor/generator coupled to the gear set, a second motor/generator at least selectively rotationally engaged with the gear set, an engine at least selectively coupled to the gear set and selectively coupled to the second motor/generator, and a clutch configured to selectively engage the second motor/generator to the engine. The second motor/generator is electrically coupled to the first motor/generator by an electrical power transmission system. The first motor/generator and the second motor/generator are electrically coupled without an energy storage device configured to at least one of (a) provide electrical energy to the first motor/generator or the second motor/generator to power the first motor/generator or the second motor/generator and (b) be charged by electrical energy from the first motor/generator or the second motor/generator.

Another exemplary embodiment relates to a vehicle drive that includes a gear set having a sun gear, a ring gear, and planetary gears, the planetary gears coupling the sun gear to the ring gear, and the planetary gears rotatably supported by a planetary gear carrier. The vehicle drive further includes a first motor/generator coupled to the gear set, a second motor/generator at least selectively rotationally engaged with the gear set, an engine at least selectively coupled to the gear set and selectively coupled to the second motor/generator, and a controller. The second motor/generator is electrically coupled to the first motor/generator by an electrical power transmission system. The first motor/generator and the second motor/generator are electrically coupled without an energy storage device configured to at least one of (a) provide electrical energy to the first motor/generator or the second motor/generator to power the first motor/generator or the second motor/generator and (b) be charged by electrical energy from the first motor/generator or the second motor/generator. The controller includes a processing circuit configured to operate the engine at a calculated speed, operate one of the first motor/generator and the second motor/generator at a calculated torque, and operate the other of the first motor/generator and the second motor/generator to maintain a voltage on the electrical power transmission system.

Still another exemplary embodiment relates to a method of operating a hybrid vehicle drive that includes providing electrical energy from one of a first electromagnetic device and a second electromagnetic device to a transmission of the hybrid vehicle drive to provide a torque to an output of the hybrid vehicle drive without providing electrical energy from an energy storage device to either the first electromagnetic device or the second electromagnetic device.

BRIEF DESCRIPTION OF THE DRAWINGS

FIG. 9A is a schematic diagram of electromagnetic device EM1 in generating mode and EM2 in motoring mode, according to an exemplary embodiment.

FIG. 9B is a schematic diagram of electromagnetic device EM2 in generating mode and EM1 in motoring mode, according to an exemplary embodiment.

FIG. 9C is a schematic diagram of electromagnetic devices EM1 and EM2 in generating mode, according to an exemplary embodiment.

FIG. 12 is a chart for determining whether electromagnetic devices EM1, EM2 are motoring or generating, according to an exemplary embodiment.

FIG. 18A is a plot of simulated vehicle speed as a function of time, according to an exemplary embodiment.

FIG. 18B is a plot of simulated engine speed and speeds of electromagnetic devices EM1, EM2, according to an exemplary embodiment.

FIG. 18C is a plot of simulated engine torque and torques of the electromagnetic devices EM1, EM2, according to an exemplary embodiment.

FIG. 18D is a plot of simulated power of the electromagnetic devices EM1, EM2, according to an exemplary embodiment.

DETAILED DESCRIPTION

Drive Train

Figure 1:
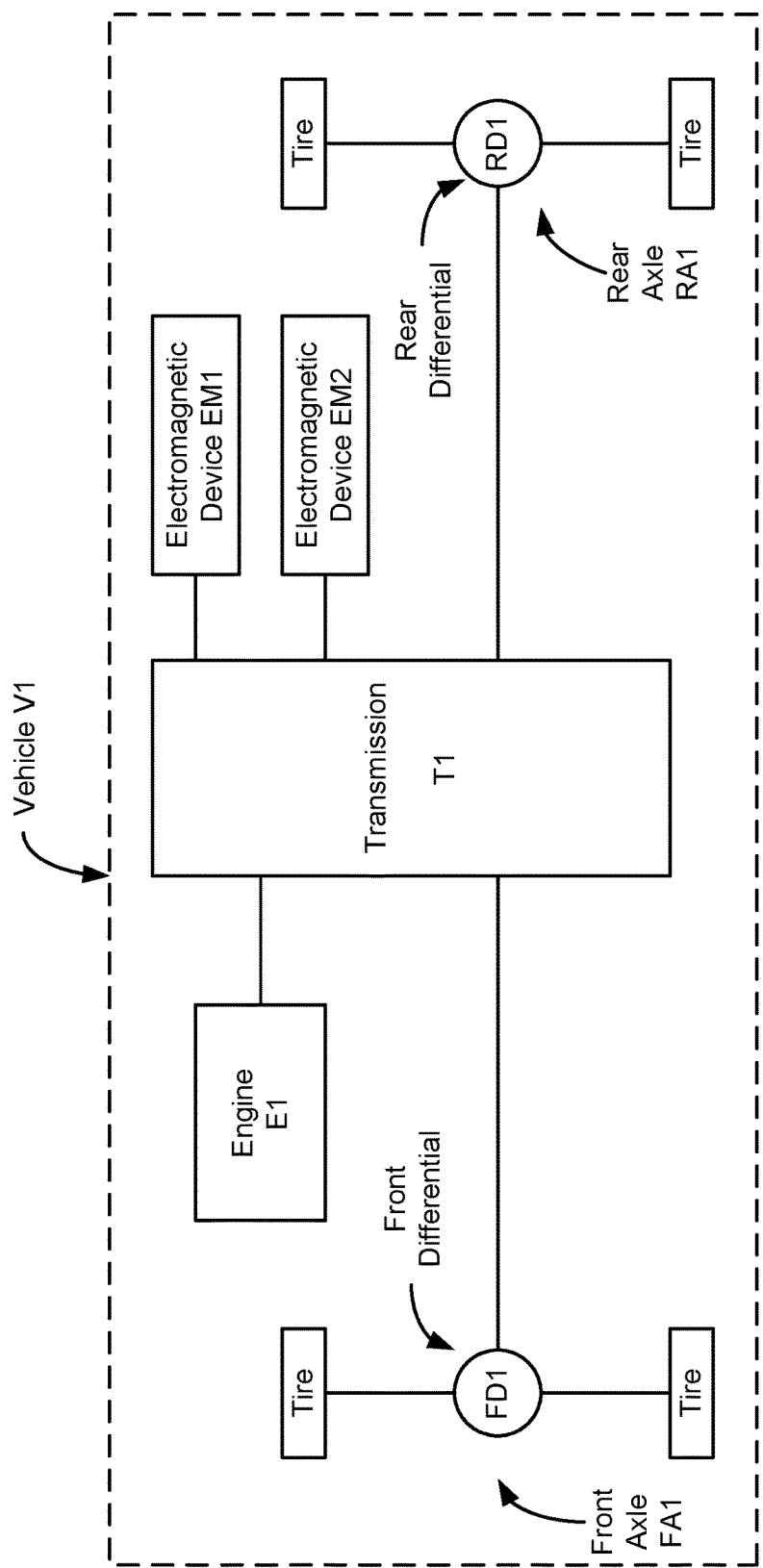
FIG. 1 is a schematic view of drive train for a vehicle according to an exemplary embodiment.

Referring to FIG. 1, a schematic view of a drive train for a vehicle V1 is shown according to an exemplary embodiment. The vehicle V1 may be a work or commercial vehicle, a military vehicle, or any other type of vehicle.

According to an exemplary embodiment, the drive train includes an engine E1 coupled to a transmission T1. The vehicle V1 also includes a first electromagnetic device EM1 coupled to the transmission T1 and a second electromagnetic device EM2 coupled to the transmission T1. The vehicle V1 also includes at least one drive axle (such as, e.g., rear axle RA1 and/or front axle FA1) coupled to the transmission T1.

According to an exemplary embodiment, the engine E1 is configured to provide rotational mechanical energy to the transmission T1. The engine E1 may be any source of rotational mechanical energy which is derived from a stored energy source such as a liquid or gaseous fuel. Examples are an internal combustion engine (such as a gas, natural gas, or diesel powered engine), turbine, fuel cell, electric motor or any other type of motor capable of providing rotational mechanical energy to the transmission T1. According to one exemplary embodiment, the engine E1 is a twelve liter diesel engine capable of providing approximately 400 to 600 horsepower, 400-1500 ft-lbs of torque, and has a rotational speed of approximately 0 to 2100 rpm. According to one exemplary embodiment, the engine E1 is operated at a relatively constant speed (such as, e.g., 1600 rpm) to maximize fuel efficiency.

According to an exemplary embodiment, the electromagnetic devices EM1, EM2 are electric motor/generator devices that are capable of providing rotational electrical energy (as an electric motor) and/or capable of producing electrical power (as a generator). According to one exemplary embodiment, the electromagnetic devices EM1, EM2 provide electric power to one another, depending on the specific mode of operation of the vehicle V1. For example, the first electromagnetic device EM1 may be operated as a generator to provide electric power to the second electromagnetic device EM2. Alternatively, the second electromagnetic device EM2 may be operated as a generator to provide electric power to the first electromagnetic device EM1.

According to one exemplary embodiment, the first electromagnetic device EM1 and the second electromagnetic device EM2 may be the same (or similar) to one another. However, according to other exemplary embodiments, the first electromagnetic device EM1 and the second electromagnetic device EM2 may be sized differently as required by a particular application. According to one exemplary embodiment, the electromagnetic devices EM1, EM2 are each capable of providing up to approximately 300 horsepower and 1300 ft-lbs of torque and are capable of rotational speeds from approximately −6,000 to 6,000 rpm (i.e., both forward and reverse from 0 to 6,000 rpm).

According to an exemplary embodiment, the transmission T1 is coupled to at least one drive axle of the vehicle V1 (such as, e.g., rear axle RA1 and/or front axle FA1 as shown in FIG. 1). According to one exemplary embodiment, both the rear axle RA1 and the front axle FA1 are driven by the transmission T1. According to other exemplary embodiments, only one of the axles may be driven by the transmission T1. According to yet another exemplary embodiment, additional axles (e.g., such as additional rear axles not shown) may be driven by the transmission T1. According to an exemplary embodiment, each of the axles are coupled to the transmission via a differential gear set (such as, e.g., rear differential RD1 and/or front differential FD1 shown in FIG. 1). Each axle is configured to drive (i.e., provide rotational energy to) one or more wheels/tires to propel (e.g., move, push, drive etc.) the vehicle V1.

Figure 2:
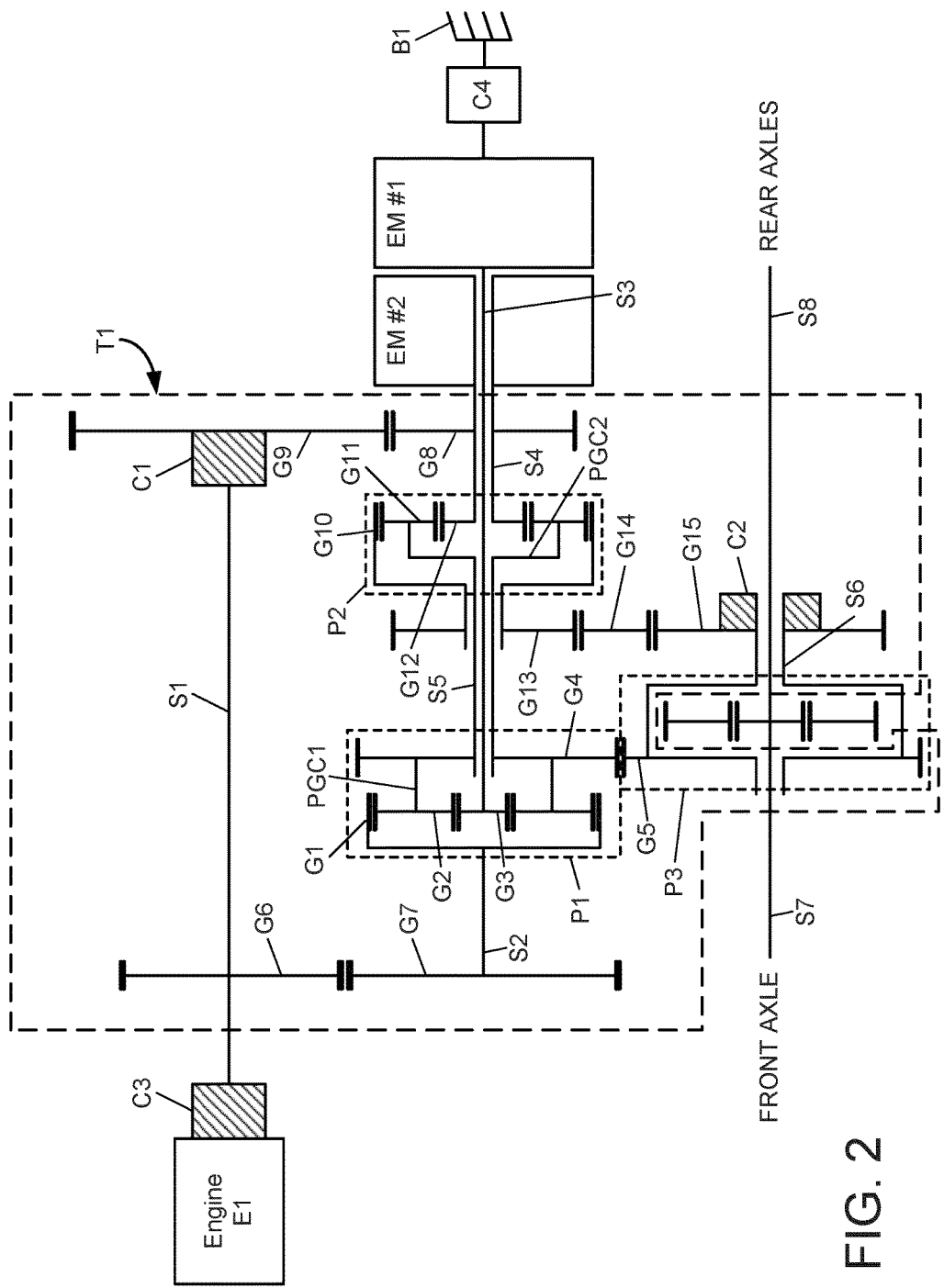
FIG. 2 is a detailed schematic view of the drive train shown in FIG. 1 according to an exemplary embodiment.

Referring now to FIG. 2, a detailed schematic view of the drive train for the vehicle V1 is shown according to exemplary embodiment. As shown in FIG. 2, the transmission T1 includes two planetary gear sets. According to an exemplary embodiment, the transmission T1 includes a first planetary gear set P1 and a second planetary gear set P2. A third planetary gear set P3 is provided as a torque divider (e.g., 30% torque to the front and 70% torque to the rear) if both the front and rear vehicle axles are powered.

According to one exemplary embodiment, the first planetary gear set P1 is configured as a power split device or power splitting planetary gear set, the second planetary gear set P2 is configured as a gear reduction and/or torque amplification device, and the third planetary gear set P3 is configured as a torque proportioning device. As shown in FIG. 2, the first planetary gear set P1 is coupled to the engine E1, the first electromechanical device EM1, the second electromechanical device EM2 (via the second planetary gear set P2), and to gear G5. The second planetary gear set P2 is also coupled to the gear G5 (via gears G13, G14, G15, clutch C2 and shaft S6).

As shown in FIG. 2, the engine E1 is coupled to a clutch C3 that is configured to selectively rotationally engage/disengage the engine E1 with the transmission T1. The clutch C3 may be any type of clutch capable of rotationally fixing the engine E1 to the transmission T1. When the clutch C3 is engaged, the engine E1 is coupled to a shaft S1. A gear G6 is coupled (e.g., rotationally fixed) to shaft S1 and engages a gear G7 that is coupled (e.g., rotationally fixed) to a shaft S2. The gear G7 in turn is coupled to the first planetary gear set P1 via the shaft S2.

As shown in FIG. 2, the first planetary gear set P1 comprises an annulus or ring gear G1 which is coupled to the shaft S2. As shown, the clutch C3, the gears G6 and G7, and the shaft S2 cooperate to permit engine E1 to drive the ring gear G1. The ring gear G1 is engaged with at least one planetary gear G2 (e.g., one, two, three, four or more planetary gears G2 that are coupled to one another (e.g., rotatably supported) by a planetary gear carrier PGC1). The planetary gear(s) G2 are engaged with a sun gear G3 of the first planetary gear set P1 to couple the ring gear G1 to the sun gear G3.

The sun gear G3 is directly coupled to the first electromagnetic device EM1 by a shaft S3. The first electromagnetic device EM1 may be coupled to an optional brake B1 by a clutch C4. The clutch C4 may be any type of clutch capable of rotationally fixing the first electromagnetic device EM1 to the brake B1. The effect of braking the first electromechanical device EM1 is to fix or hold sun gear G3 without the need to apply electrical energy to the first electromechanical device EM1 to cause the first electromechanical device EM1 to generate enough holding torque to hold the gear G3 from rotating.

According to an exemplary embodiment, the planetary gear carrier PGC1 is coupled to a carrier gear G4. The carrier gear G4 is engaged with a gear G5. In the preferred embodiment of vehicle V1, the gear G5 is part of the third planetary gear set P3 used to divide the power from the transmission T1 to the front and rear axles. In this embodiment, the gear G5 is coupled to the planetary gears of the third planetary gear set P3. If only a single axle is driven by the transmission T1, or a different transfer device is used to drive more than one axle, the third planetary gear set P3 may not be necessary.

The carrier gear G4 is also coupled to the second planetary gear set P2 by a shaft S5 (as will be described in more detail below).

Still referring to FIG. 2, the transmission T1 also includes a clutch C1 that selectively rotationally engages/disengages the engine E1 to the second electromagnetic device EM2. The clutch C1 may be any type of clutch capable of rotationally fixing the engine E1 to the second electromagnetic device EM2, such as a wet clutch.

As shown in FIG. 2, the clutch C1 is coupled to the engine E1 by the shaft S1. When the clutch C1 is engaged, the shaft S1 is coupled to a gear G9. The gear G9 in turn is engaged with a gear G8 that is coupled to the second electromagnetic device EM2. Thus, when the clutch C1 is engaged, the engine is coupled to the second electromagnetic device EM2 to allow the second electromagnetic device EM2 to be driven as a generator (e.g., to provide electrical power to the first electromagnetic device EM1).

The electromagnetic device EM2 is also coupled to the second planetary gear set P2 by a shaft S4. The shaft S4 is connected to a sun gear G12 of the second planetary gear set P2. The sun gear G12 is engaged with at least one planetary gear G11 (e.g., one, two, three, four or more planetary gears G11 that are coupled to one another (e.g., rotatably supported) by a planetary gear carrier PGC2). The planetary gear(s) G11 in turn are engaged with an annulus or ring gear G10 to couple the sun gear G12 to the ring gear G10.

According to an exemplary embodiment, the planet gear carrier PGC2 of the second planetary gear P2 is coupled to the carrier gear G4 (and the planet gear carrier PGC1) of the first planetary gear set P1 by a shaft S5. Thus, the planet gear carrier PGC1 and the planet gear carrier PGC2 are coupled to one another so that the second electromagnetic device EM2 is coupled to the first planetary gear set P1 via the second planetary gear set P2.

The second electromagnetic device EM2 is also coupled to the third planetary gear set P3 via the second planetary gear set P2. According to an exemplary embodiment, the ring gear G10 of the second planetary gear P2 is coupled to an output gear G13 that is engaged with an idler gear G14. The idler gear G14 in turn is engaged with a gear G15 that is selectively engaged/disengaged to the third planetary gear set P3 by a clutch C2 (via a shaft S6). The clutch C2 may be any type of clutch capable of rotationally fixing the gear G15 to the shaft S6, such as a wet clutch.

According to an exemplary embodiment, the third planetary gear set P3 is a torque proportioning device for the front and rear axles of the vehicle V1. Torque is delivered from the third planetary gear set P3 to the front axle FA1 and/or the rear axle RA1 via shafts S7 and S8. As discussed above, in other exemplary embodiments, the third planetary gear set P3 is not necessary when either the front axle FA1 or rear axle RA1 of the vehicle V1 is not driven by the transmission T1.

According to an exemplary embodiment, the transmission T1 is operated in a low speed mode (e.g., a vehicle speed of approximately 0-10 mph) by having the clutch C2 engaged and the clutch C1 disengaged. According to another exemplary embodiment, the transmission T1 is operated in a high speed mode (e.g., a vehicle speed of approximately 10-65 mph) by having the clutch C1 engaged and the clutch C2 disengaged. According to other various embodiments, the vehicle speeds in the low and high speed modes may vary higher or lower.

Figure 3:
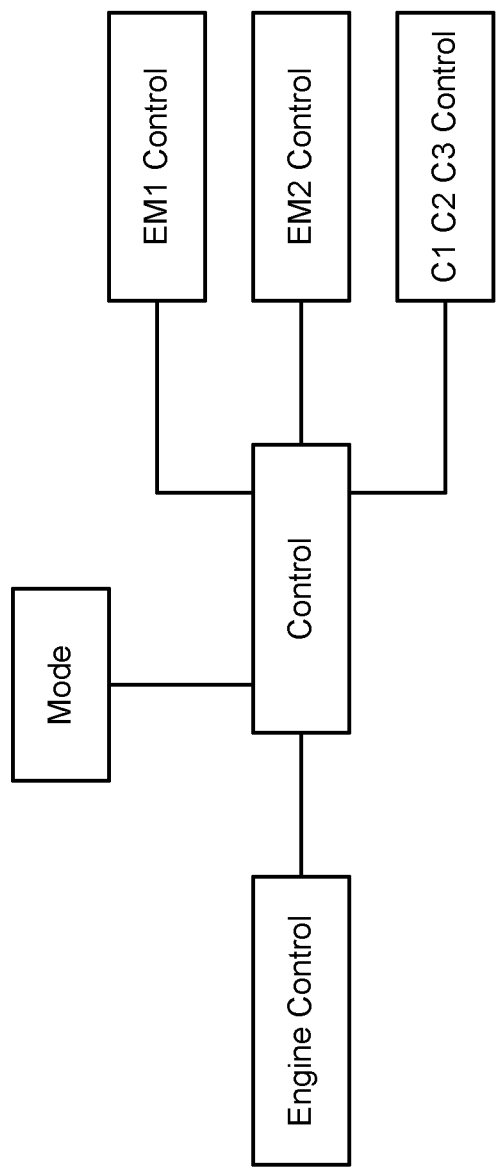
FIG. 3 is a schematic diagram of a control system for the drive train shown in FIG. 1 according to an exemplary embodiment.

According to an exemplary embodiment, an operator (e.g., driver) of vehicle V1 may manually switch the transmission T1 from low speed mode to high speed mode or vice-versa. According to another exemplary embodiment, the transmission T1 is automatically switched from low speed mode to high speed mode (and vice-versa) by a control system (see, e.g., FIG. 3). The control system may include various operator inputs (such as, e.g., desired vehicle speed, torque, traction, terrain, etc.) and also various system inputs (such as, e.g., current vehicle speed, engine speed, power, and torque, electromagnetic device speed, power, and torque, etc.). As shown in FIG. 3, according to one exemplary embodiment, the control system is configured to monitor and/or control the engine, the mode of the transmission, the first electromagnetic device EM1, the second electromagnetic device EM2, the clutch C1, the clutch C2, and/or the clutch C3.

According to an exemplary embodiment, gears within the transmission T1 are sized according to the specific application and desired performance characteristics of the vehicle V1. According to one exemplary embodiment, the gears within the transmission T1 have tooth counts as shown in Table 1. However, according to other exemplary embodiments, the tooth counts of the gears may vary more or less than that shown. According to other exemplary embodiments, the engine E1, the electromagnetic devices EM1 and EM2, the clutches C1-C4, and the shafts S1-S8 may all vary according to the specific application and desired performance characteristics of the vehicle V1.

TABLE 1

| Gear # | Tooth Count |
| --- | --- |
| Gear 1 | 81 |
| Gear 2 | 24 |
| Gear 3 | 33 |
| Gear 4 | 77 |
| Gear 5 | 77 |
| Gear 6 | 49 |
| Gear 7 | 50 |
| Gear 8 | 55 |
| Gear 9 | 74 |
| Gear 10 | 64 |
| Gear 11 | 19 |
| Gear 12 | 26 |
| Gear 13 | 28 |
| Gear 14 | 47 |
| Gear 15 | 82 |

It should be noted that references to "front," "rear," "top," and "base" in this description are merely used to identify various elements as are oriented in the FIGS., with "front" and "rear" being relative to the environment in which the device is provided.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the electromechanical variable transmission as shown in the various exemplary embodiments is illustrative only. Although only a few embodiments have been described in detail in this disclosure, those skilled in the art who review this disclosure will readily appreciate that many modifications are possible (for example, variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

Control Strategy

The components of vehicle V1 (e.g., transmission T1, engine E1, electromagnetic devices EM1, EM2, etc.) may be controlled so an operator of the vehicle can propel the vehicle as desired. The components of vehicle V1 may be configured to deliver the power requested by the operator to the wheels of the vehicle. In some embodiments, vehicle V1 may be advantageously propelled in a fuel-efficient manner. In some embodiments, vehicle propulsion may also be accomplished while maintaining engine E1 and electromagnetic devices EM1, EM2 within acceptable operating speeds. In some embodiments, electromagnetic devices EM1, EM2 may generate and use electrical power without an energy storage device. In some embodiments, power balance may be advantageously maintained between EM1 and EM2.

Figure 4:
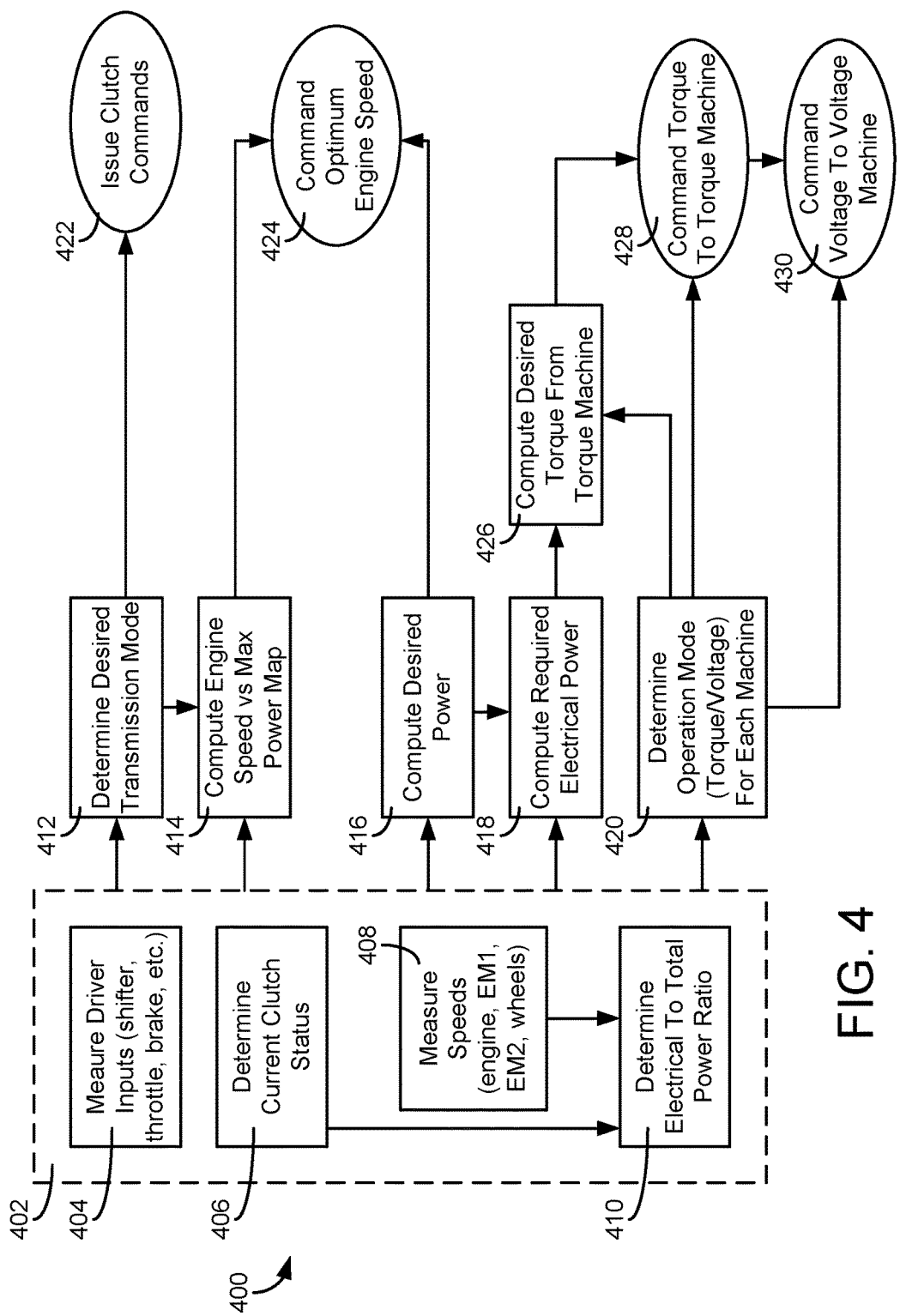
FIG. 4 is a flow diagram of a process for controlling the propulsion of the vehicle, according to an exemplary embodiment.
Figure 19A:
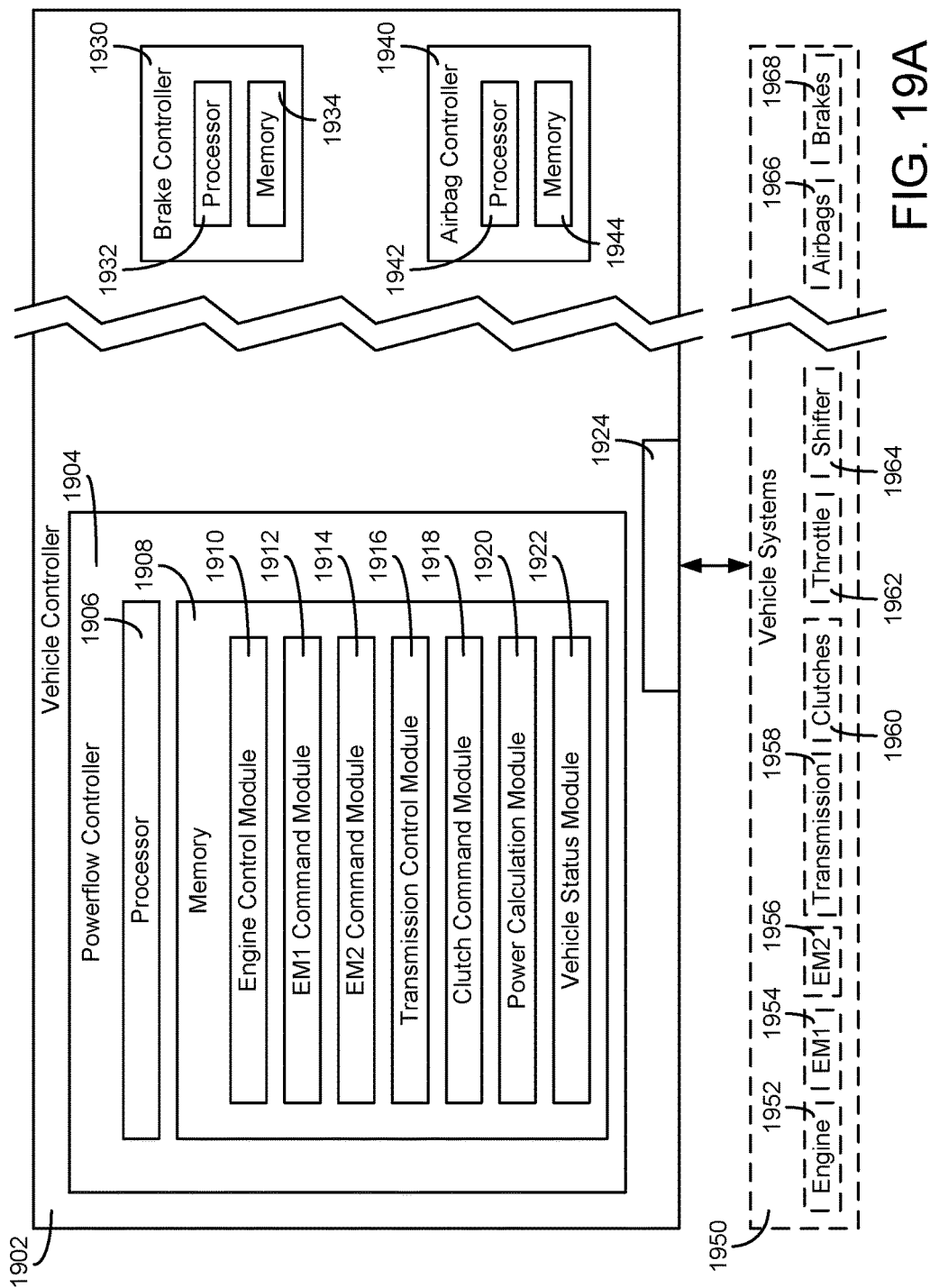
FIG. 19A is a block diagram of a vehicle controller, according to an exemplary embodiment.

Referring to FIG. 4, a flow diagram of a process 400 for controlling the propulsion of the vehicle is shown, according to an exemplary embodiment. Process 400 may be implemented by a control system, such as control system 300 (FIG. 3), or a vehicle controller, such as vehicle controller 1902 (FIG. 19A). The control system and/or vehicle controller may be configured to receive inputs from an operator of the vehicle. The control system and/or vehicle controller may be further configured to determine appropriate operating conditions for the engine, electromagnetic devices, transmission, and other components of the vehicle based on the operator's inputs. The control system and/or vehicle controller may be further configured to output commands to various components (e.g., engine, electromagnetic devices, clutches, etc.) of the vehicle based on the operating conditions determined to be appropriate. One or more of the steps of process 400 may be more fully described in the discussion of process 1400 (FIG. 14), process 1500 (FIG. 15), and/or process 1600 (FIG. 16).

Process 400 includes determining the current status of the vehicle and its components (402). The current status may be received and/or determined by powerflow controller 1904 of vehicle controller 1902 (FIG. 19A). Determining the current status of the vehicle includes measuring inputs from a vehicle operator as to the desired operating state of the vehicle (404). Inputs may include shifter position (e.g., reverse, neutral, drive, etc.), throttle (based on, e.g., accelerator pedal sensor), brake, etc. Determining the current status of the vehicle also includes determining current clutch status (406). In some embodiments, a clutch may be engaged or disengaged. The status of clutches (e.g., clutches C1, C2 of FIG. 2) may determine the configuration of the transmission (e.g., output-coupled or input-coupled). Determining the current status of the vehicle also includes measuring current engine speed, electromagnetic device EM1 speed, electromagnetic device EM2 speed, and vehicle speed (408). Speeds may be monitored by powerflow controller 1904 (FIG. 19A). Determining the current status of the vehicle also includes determining the electrical power to total power ratio (410). According to an exemplary embodiment, the ratio of electrical power to total power in the drive train may be equal to a function of the engine speed and the vehicle speed.

Process 400 includes determining the configuration of the transmission (412). According to an exemplary embodiment, the transmission of the vehicle may be configurable in two modes. In some embodiments, an output-coupled (OC) mode may be used for low vehicle speeds (e.g., approximately 0-10 mph), and an input-coupled (IC) mode may be used for high vehicle speeds (e.g., approximately 10-65 mph). The modes may differ at least in how components of the drive train, such as a planetary gear set and an electromagnetic device, are coupled to each other. A particular configuration may be chosen by engaging or disengaging clutches, such as clutch C1 and clutch C2 of FIG. 2. A transmission configuration may be chosen based on, e.g., maintaining the electromagnetic devices at acceptable operating speeds, delivering the power requested to the wheels of the vehicle, etc. Step 412 determines whether the current clutch status (determined in step 406) should be changed so the transmission is in a different configuration (i.e., from IC or OC, or from OC to IC).

Process 400 includes operating the clutches to reach the desired transmission configuration (422). If a change of transmission configuration is necessary (e.g., from output-coupled to input-coupled), then clutch statuses may change. According to an exemplary embodiment, clutch C1 may be engaged and clutch C2 may be disengaged when the transmission is in input-coupled mode. In output-coupled mode, clutch C1 may be disengaged and clutch C2 may be engaged. Commands to the clutches may be transmitted by powerflow controller 1904 of vehicle controller 1902 (FIG. 19A).

Process 400 includes computing maximum power available at current operating conditions (414). The maximum power available may describe the power that can be delivered to the wheels of the vehicle, based on input from the vehicle operator (e.g., increasing throttle). The maximum power available may be determined at least in part by transmission mode, and current vehicle speed, engine speed, EM1 speed, and EM2 speed. According to an exemplary embodiment, the maximum power available may vary for each vehicle speed. For each vehicle speed, the maximum power available may vary for each engine speed and for each transmission mode. According to an exemplary embodiment, powerflow controller 1904 of vehicle controller 1902 (FIG. 19A) may compute a collection or map of maximum power at a variety of vehicle speeds, engine speeds, and transmission configurations.

Process 400 includes computing the power desired by a vehicle operator (416). The proportion of available power desired by the operator may be described by the throttle input. Throttle input may be measured by an accelerator pedal sensor. For example, an operator may request maximum power at 100% or full throttle (i.e., depressing the accelerator pedal to the greatest extent possible). The power desired by the operator may be computed by multiplying the throttle input proportion (measured in step 404) by the maximum power available (computed in step 414).

Process 400 includes determining an optimum engine speed (424). Engine speed may be determined based on the maximum power available (computed in step 414) and the power desired by the operator of the vehicle (computed in step 416). For example, if the current engine speed is too low to provide the power requested, then engine speed may be increased. According to an exemplary embodiment, a range of engine speeds may provide the required power. A particular engine speed may be selected from the range to advantageously maximize fuel economy. In some embodiments, the lowest speed in the range may be chosen for the engine speed. In other embodiments, an engine speed may be selected in order to satisfy a variety of constraints on the drive train (e.g., maintaining electromagnetic devices EM1, EM2 within acceptable operating speeds).

Process 400 includes computing the required electrical power (418). According to an exemplary embodiment, power in the transmission may flow in two paths: electrical and mechanical. The phrase "electrical power" describes power in the drive train that flows through the electromagnetic devices. Electrical power originates as mechanical power from the engine and terminates as mechanical power at the transmission. In some embodiments, the electrical power can be calculated based on the total power (computed in step 416) and the electrical to total power ratio (determined in step 410). According to an exemplary embodiment, the portion of total power requested by the vehicle operator that is electrical power can be computed by multiplying the total power by the electrical to total power ratio. According to an exemplary embodiment, the electrical power required may be generated by one of the electromagnetic devices EM1, EM2.

Process 400 includes determining the operational mode for the electromagnetic devices EM1, EM2 (420). According to an exemplary embodiment, EM1 and EM2 may either be in torque mode or voltage mode. An electromagnetic device in torque mode may be referred to as a torque machine, and an electromagnetic device in voltage mode may be referred to as a voltage machine. Torque mode may describe the state of an electromagnetic device that maintains a calculated torque at its output. Voltage mode may describe the state of an electromagnetic device that maintains power balance with the electromagnetic device in torque mode. The voltage machine may maintain a voltage on the DC bus between EM1 and EM2. The DC bus may be considered an electrical power transmission system. In both torque mode and voltage mode, EM1 and EM2 may be motoring (receiving electrical power from the other electromagnetic device and providing mechanical power to the wheels of the vehicle) or generating (receiving mechanical power from the engine and providing electrical power to the other electromagnetic device). In some embodiments, EM1 may be in voltage mode and EM2 may be in torque mode for low vehicle speeds. EM1 may be in torque mode and EM2 may be in voltage mode for high vehicle speeds. When the vehicle is accelerating from low vehicle speeds to higher vehicle speeds, step 420 determines whether EM1 should switch to torque mode and whether EM2 should switch to voltage mode. According to an exemplary embodiment, EM1 may switch from voltage mode to torque mode when EM1 speed is less than a threshold speed. In some embodiments, EM2 may switch to voltage mode after the transmission configuration has changed from output-coupled to input-coupled.

Process 400 includes computing the torque required from the electromagnetic device in torque mode (426). The torque may be computed by dividing the required electrical power (computed in step 418) by the speed of the electromagnetic device (measured in step 408). Computation of the torque command is described in greater detail in the discussion of FIG. 16. The torque and speed of a given electromagnetic device may be adjusted to so that it outputs the required power. For example, to achieve the required power, speed or torque or both may be increased. According to an exemplary embodiment, the power used or generated by the voltage machine may be approximately equal to the power generated or used by the torque machine. The power may not be exactly equal because of ordinary electrical power losses. The torque computation may estimate the power losses and select a torque that is consistent with the expected electrical power flow in the drive train. Once the torque has been computed, process 400 includes commanding the torque to the torque machine (428).

Process 400 includes commanding the voltage machine to maintain power balance with the torque machine (430). The voltage machine may maintain power balance with the torque machine by providing electrical power to the torque machine (when the torque machine is motoring) or receiving electrical power from the torque machine (when the torque machine is generating). The voltage machine may be controlled using closed loop control on the voltage on the DC bus between the two electromagnetic devices. The closed loop control scheme is described in greater detail in the discussion of FIG. 15, below. The voltage machine may increase or decrease voltage on the DC bus by increasing or decreasing its torque or speed or both.

Transmission Configurations

According to an exemplary embodiment, the purpose of transmission T1 is to take power from engine E1 at the transmission's input shaft and deliver the power to the transmission's output shaft for subsequent delivery to the wheels of vehicle V1 for vehicle propulsion.

Figure 5:
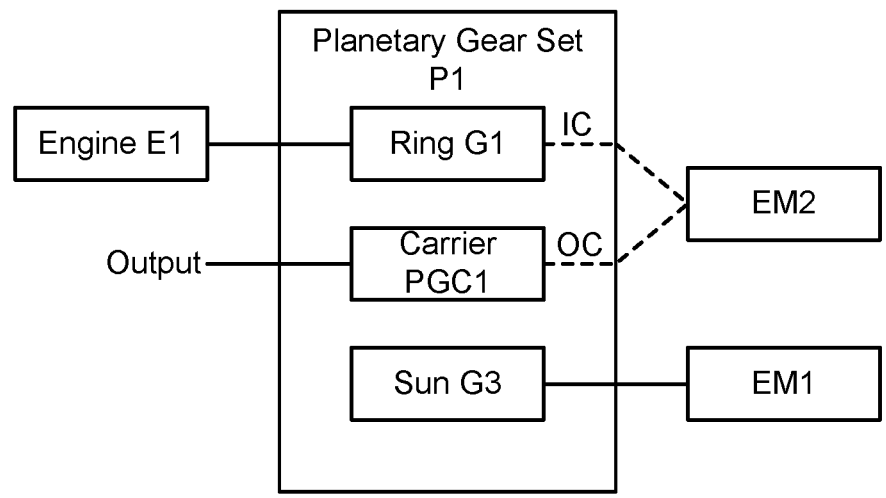
FIG. 5 is a schematic view of a planetary gear set for the vehicle, according to an exemplary embodiment.

Referring to FIG. 5, a schematic view of a planetary gear set for the vehicle is shown, according to an exemplary embodiment. The planetary gear set P1 of FIG. 5 shows the component gears of the planetary gear set are coupled to an engine and two electromagnetic devices. One or more of the elements of FIG. 5 may have similar structure and/or function as described with respect to the corresponding elements of FIG. 2. FIG. 5 may not show or describe all of the elements and functions of FIG. 2, and FIG. 2 may not show or describe all of the elements and functions of FIG. 5. The schematic view of FIG. 5 may omit intermediate coupling details, such as intermediate planetary gear sets, gears, shafts, and clutches.

Planetary gear set P1 of FIG. 5 may be the same as or similar to the planetary gear set P1 depicted in FIG. 2. Planetary gear set P1 may have a ring gear G1, planetary gear carrier PGC1, and sun gear G3. As discussed in the description of FIG. 2, ring gear G1 may be coupled to sun gear G1 via at least one planetary gear (not shown in FIG. 5). According to an exemplary embodiment, the output of planetary gear set P1 may be coupled to planetary gear carrier PGC1.

The planetary gear set of FIG. 5 includes engine E1. According to an exemplary embodiment, engine E1 may be coupled to ring gear G1. In some embodiments, engine E1 may remain coupled to ring gear G1 regardless of whether vehicle V1 is in input-coupled or output-coupled mode (i.e., regardless of the vehicle speed). In some embodiments, when the transmission is input-coupled, the engine is selectively coupled to the second motor/generator via the. In some embodiments, engine E1 is also uncoupled from the output of the planetary gear set P1 when vehicle V1 is in input-coupled mode and output-coupled mode. Thus, engine speed is uncoupled from vehicle speed for all vehicle speeds.

The planetary gear set of FIG. 5 includes electromagnetic device EM1. According to an exemplary embodiment, EM1 may be coupled to sun gear G3. At any given vehicle speed, EM1 speed increases (i.e., becomes more positive) when engine speed increases. EM1 speed decreases when vehicle speed increases. According to some embodiments, EM1 speed may be positive at low vehicle speeds. As vehicle speed increases, EM1 speed becomes more negative. As described in the discussion of FIG. 5, EM1 switches from voltage mode to torque mode when EM1 speed is less (i.e., more negative) than a threshold speed. EM1 speed may near a maximum speed in the negative direction at high vehicle speeds. In order to maintain EM1 speed below the maximum, engine speed may be increased, causing EM1 speed to become more positive. In some embodiments, EM1 may remain coupled to engine E1 and the output of planetary gear set P1, regardless of whether vehicle V1 is in input-coupled or output-coupled mode (i.e., regardless of the vehicle speed).

The planetary gear set of FIG. 5 includes electromagnetic device EM2. According to an exemplary embodiment, EM2 may be selectively coupled to the planetary gear carrier PGC1 of the first planetary gear set and the ring gear G1 of the first planetary gear set. According to an exemplary embodiment, EM2 may be coupled to planetary gear carrier PGC1, if the transmission is output-coupled, and ring gear G1, if the transmission is input-coupled. When EM2 is output-coupled, EM2 is coupled to the output of the planetary gear set P1, which is also coupled to planetary gear carrier PGC1. In some embodiments, EM2 is coupled to the output of planetary gear set P2. In some embodiments, when the transmission is output-coupled, a first clutch (e.g., the output clutch) is configured to selectively engage the second motor/generator to the planetary gear carrier PGC1 of the first planetary gear set. In the discussion herein, EM2 may be described as being coupled to the output planetary gear set P1 because the outputs of both planetary gear sets are ultimately combined to propel the vehicle. EM2 speed may be proportional to vehicle speed when EM2 is output-coupled. According to an exemplary embodiment, the transmission may be coupled to output of the planetary gear set P1 at a high gear ratio. Thus, EM2 speed may increase rapidly as vehicle speed increases. When the transmission is input-coupled, EM2 is coupled to engine E1, which is also coupled to ring gear G1. In some embodiments, when the transmission is input-coupled, a second clutch (e.g., the input clutch) is configured to selectively engage the second motor/generator to the engine. EM2 speed may be proportional to engine E1 speed when the transmission is input-coupled. According to an exemplary embodiment, the transmission may be output-coupled at low vehicle speeds and input-coupled at high vehicle speeds. The transmission may be configured to switch between output-coupled mode and input-coupled mode depending on EM2's speed, as described in the discussion of FIG. 6-8, below.

Referring again to FIG. 2, a more detailed schematic view of the drive train for vehicle V1 is shown, according to an exemplary embodiment. One or more of the elements of FIG. 2 may have similar structure and/or function as described with respect to the corresponding elements of FIGS. 1 and 5. FIG. 2 may not show or describe all of the elements and functions of FIGS. 1 and 5, and FIGS. 1 and 5 may not show or describe all of the elements and functions of FIG. 2.

The drive train of FIG. 2 includes engine E1, and electromagnetic devices EM1, EM2. The drive train of FIG. 2 also includes transmission T1. As described in the discussion of FIG. 2, engine E1 may be coupled to transmission T1 by clutch C3. According to an exemplary embodiment, engine E1 may be coupled to transmission T1 for all vehicle speeds.

In the embodiment of FIG. 2, transmission T1 is shown to include planetary gear set P1. Transmission T1 also includes clutch C1 and clutch C2. Clutch C1 may be described as an input clutch (or second clutch), and clutch C2 may be described as an output clutch (or first clutch). Whether clutch C1 and clutch C2 are engaged or disengaged may govern the coupling of EM2 to planetary gear set P1. According to an exemplary embodiment, when transmission T1 is output-coupled, clutch C1 is disengaged, clutch C2 is engaged, and EM2 is coupled to planetary gear carrier PGC1 of planetary gear set P1. When transmission T1 is input-coupled, clutch C1 is engaged, clutch C2 is disengaged, and EM2 is coupled to the ring gear G1 of planetary gear set P1.

According to an exemplary embodiment, the drive train of vehicle V1 may be mechanically coupled in two configurations. The two configurations may be termed input-coupled and output-coupled. Input-coupled and output-coupled may specifically refer to how electromagnetic device EM2 is coupled to one or more planetary gear sets of vehicle V1. "Input-coupled" and "output-coupled" are used to generally refer to configuration modes of vehicle V1 and/or transmission T1. In other embodiments, the drive train of FIGS. 1 and 2 may be operable in one configuration or more than two configurations.

According to an exemplary embodiment, the drive train of vehicle, such as the drive train of vehicle V1 of FIGS. 1, 2, and 5 may be configured to switch between output-coupled mode and input-coupled mode. Vehicle V1 may switch from input-coupled mode to output-coupled mode and from output-coupled mode to input-coupled mode depending on the operating conditions of the vehicle. Relevant operating conditions may include vehicle speed and speed of electromagnetic device EM2. The vehicle may switch between output-coupled mode and input-coupled mode when EM2 speed is greater than a threshold.

Figure 6:
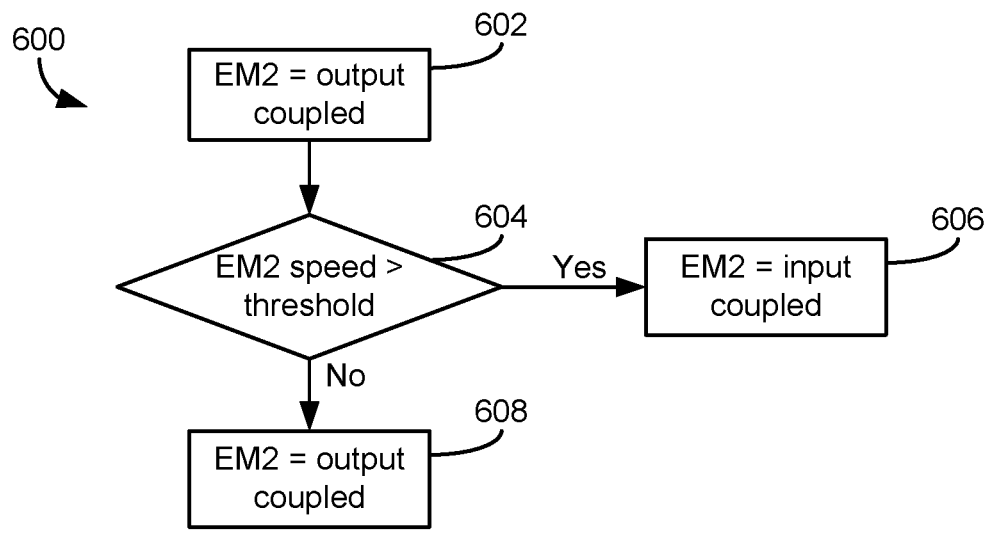
FIG. 6 is a flow diagram of a process for choosing whether the transmission is input-coupled and output-coupled, according to an exemplary embodiment.

Referring to FIG. 6, a flow diagram of a process 600 for choosing whether the transmission is input-coupled or output-coupled is shown, according to an exemplary embodiment. Process 600 may be carried out by a control system, such as control system 300 (FIG. 3) and/or vehicle controller, such as vehicle controller 1902 (FIG. 19A). Though FIG. 6 may refer to a specific electromagnetic device, e.g., EM2, as being coupled to a particular component of the drive train, both EM1 and EM2 may be capable of operating as described below.

Process 600 includes operating the vehicle with the transmission output-coupled (602). When the transmission is output-coupled, clutch C2 is engaged and clutch C1 is disengaged (FIG. 2). Thus, EM2 is coupled to planetary gear carrier PGC1 when the transmission is output-coupled. Planetary gear carrier PGC1 is also coupled to the output of planetary gear set P1, meaning EM2 is coupled to the output. In some embodiments, EM2 is coupled to the output of planetary gear set P2. The combined outputs of planetary gear sets P1 and P2 may provide mechanical power to one or more drive axles to propel the vehicle. When vehicle V1 is output-coupled, EM2 speed is directly proportional to the speed of vehicle V1. According to an exemplary embodiment, the transmission may be output-coupled when vehicle V1 speeds are low (e.g., 0-10 mph). As vehicle V1 accelerates, EM2 speed increases.

According to an exemplary embodiment, EM2 may be in torque mode for low vehicle speeds. Because EM2 speed increases as vehicle V1 speed increases for low vehicle speeds, EM2 may have sufficient speed to be assume the role of voltage machine when required. As described in the discussion of FIG. 10, EM2 switches from torque mode to voltage mode when EM1 switches from voltage mode to torque mode (i.e., when EM1 speed drops below a threshold speed such that it can no longer generate sufficient electrical power to maintain a DC bus voltage and supply EM2's electrical power demand).

Process 600 includes determining if EM2 speed is above a threshold (604). Because EM2 is coupled to the output of planetary gear set P1, EM2 speed increases as the speed of vehicle V1 increases. EM2 speed may reach a threshold speed beyond which it may not operate. The threshold speed may be a result of EM2's mechanical limitations and may vary depending on the electromagnetic device used. The upper threshold of EM2 may be set by a manufacturer of the device. According to some embodiments, approximately 6000 RPM may be an upper threshold. The transmission may switch from output-coupled mode to input-coupled mode at or near the threshold speed.

Process 600 includes operating the vehicle with the transmission input-coupled if EM2 speed is above the threshold (606). When the transmission is input-coupled, clutch C1 is engaged and clutch C2 is disengaged (FIG. 2). Thus, EM2 is coupled to ring gear G1 when the transmission is input-coupled. Ring gear G1 is also coupled to engine E1, meaning EM2 is coupled to engine E1. When vehicle V1 is output-coupled, EM2 speed is directly proportional to the speed of engine E1. According to an exemplary embodiment, the transmission may be input-coupled when vehicle V1 speeds are high (e.g., 10-65 mph). Because engine speed is decoupled from vehicle speed for all vehicle speeds, EM2 speed is not directly affected by vehicle speed.

Process 600 includes operating the vehicle with the transmission output-coupled if EM2 speed remains below the threshold (608).

Process 600 may describe whether the transmission is input-coupled or output-coupled when vehicle V1 is accelerating. A process similar to process 600 may occur when the vehicle is decelerating. According to an exemplary embodiment, the transmission will switch from input-coupled mode to output-coupled mode such that (a) EM2 speed goes through a minimal change; and (b) the vehicle gets sufficient torque to wheels. For example, if the vehicle is decelerating due to no throttle, the IC/OC switch will take place when EM2 speed before and after the mode change is approximately the same. This may be described as a zero or low inertia shift because EM2 speed does not change or changes very little.

Figure 7:
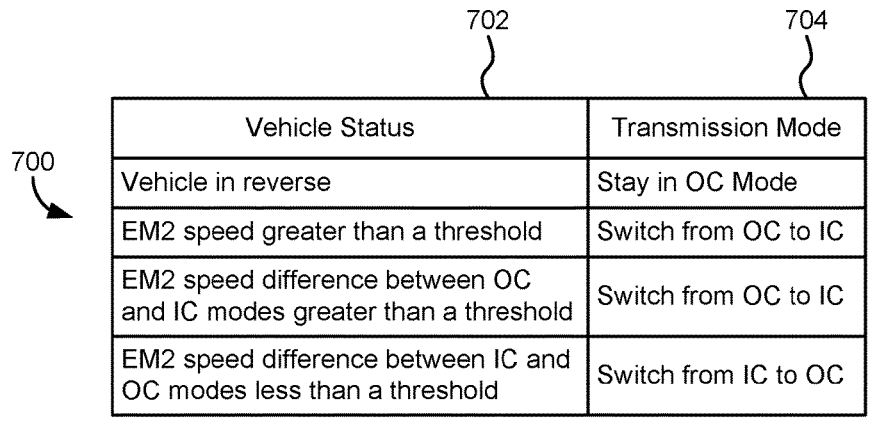
FIG. 7 is a chart 700 describing whether the transmission is input-coupled or output-coupled, according to an exemplary embodiment.

Referring to FIG. 7, a chart 700 describing whether transmission T1 is input-coupled or output-coupled is shown, according to an exemplary embodiment. Chart 700 describes more particularly the conditions when the transmission switches from output-coupled to input-coupled (or vice versa). Chart 700 includes vehicle operating statuses (702) and the corresponding transmission configurations (704). The operations described in chart 700 may be implemented by powerflow controller 1904 of vehicle controller 1902 (FIG. 19A). For example, if the vehicle status requires a switch from output-coupled mode to input-coupled mode, then powerflow controller 1904 may transmit a command to clutches C1, C2 to reach the correct configuration.

Chart 700 shows that the transmission switches from output-coupled to input-coupled when EM2 speed is greater than a threshold. As described in the discussion of process 600 (FIG. 6), EM2 speed may reach a threshold speed beyond which it may not operate. Switching from output-coupled to input-coupled configuration may advantageously decrease EM2 speed and advantageously prevent EM2 from operating at an excessive speed.

Chart 700 shows that the transmission is in output-coupled configuration when the vehicle is in reverse. According to an exemplary embodiment, EM1 speed and EM2 speed may increase as vehicle speed, in reverse, increases. EM1 speed may increase because EM1 is coupled to the sun gear G3 of the planetary gear set P1 for all vehicle speeds. EM2 speed may increase because EM2 is coupled to the carrier gear G2 (output) of the planetary gear set P1 when the transmission is output-coupled.

Chart 700 shows that the transmission will switch configurations (from output-coupled to input-coupled) when the difference of EM2 speed in output-coupled mode and EM2 speed in input-coupled mode is above a threshold. In some embodiments, the threshold may be a fixed speed. In other embodiments, the threshold may be dynamic. The threshold may vary depending on the throttle input proportion, i.e., the threshold may be a fixed speed multiplied by the throttle input proportion. For example, threshold=200 RPM×50% throttle=100 RPM. In still other embodiments, a dynamic threshold with positive or negative offsets may be used. When the threshold is related to the throttle input, the shift from output-coupled mode to input-coupled mode may be advantageously delayed to a higher vehicle speed. The transmission may remain output-coupled longer when throttle input is high than if the vehicle were experiencing lesser throttle input. According to an exemplary embodiment, more power is available to be delivered to the wheels when the transmission is in output-coupled mode (as described in the discussion of FIG. 13). By delaying the transition to input-coupled mode when the vehicle is under high tractive demand, more power is advantageously available to the vehicle for a longer period of time.

Powerflow controller 1904 of FIG. 19A may be configured to measure and monitor EM2 speed. Powerflow controller 1904 may be further configured to measure the difference of EM2 speed in output-coupled and input-coupled modes. In order to so, powerflow controller 1904 may determine what the speed of EM2 would be were the transmission input-coupled, if the transmission is actually output-coupled. Similarly, if the transmission is actually input-coupled, then powerflow controller 1904 may determine what the speed of EM2 would be were the transmission output-coupled.

Chart 700 shows that the transmission will switch configurations (from input-coupled to output-coupled) when the difference of EM2 speed in output-coupled mode and EM2 speed in input-coupled mode is below a threshold. Depending on the embodiment, the threshold may be fixed or dynamic, with positive or negative offsets, as described above. A threshold that is related to throttle input may be advantageous when a vehicle is decelerating (due to, e.g., no throttle). In some embodiments, the transmission may switch from input-coupled mode to output-coupled mode so that the change in EM2 speed is minimal. This advantageously minimizes the status change felt by a vehicle operator. In other embodiments, when the vehicle is experiencing high tractive demands (and higher throttle), the transmission may shift to output-coupled mode sooner so that more power is available.

Figure 8:
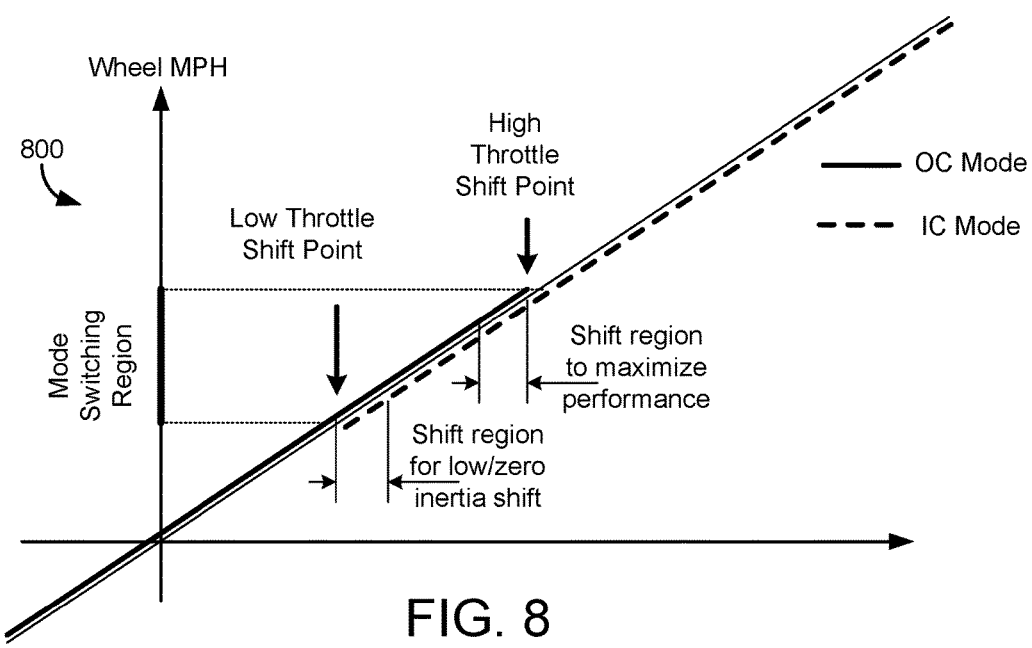
FIG. 8 is a plot describing whether the transmission is input-coupled or output-coupled is shown, according to an exemplary embodiment.

Referring to FIG. 8, a plot 800 describing whether the transmission is input-coupled or output-coupled is shown, according to an exemplary embodiment. Plot 800 represents, in graph-format, the conditions when the transmission switches from output-coupled mode to input-coupled mode (or vice versa). The x-axis of plot 800 is time. The y-axis of plot 800 is wheel speed. Plot 800 shows an embodiment in which vehicle speed increases linearly in time. In other embodiments, vehicle speed may increase non-linearly. For example, vehicle speed may increase with time in the manner shown in FIG. 18A. Plot 800 may depict relative (and not absolute) conditions when a vehicle switches between input-coupled and output-coupled mode. Thus, the regions depicted in FIG. 8 apply even when vehicle speeds increase non-linearly. The regions depicted in FIG. 8 may also apply when vehicle speed is decreasing. The operations described in plot 800 may be implemented by powerflow controller 1904 of vehicle controller 1902 (FIG. 19A). For example, if the vehicle status requires a switch from output-coupled mode to input-coupled mode, then powerflow controller 1904 may transmit a command to clutches C1, C2 to reach the correct configuration.

Plot 800 shows that the transmission is output-coupled for low vehicle speeds (according to an exemplary embodiment, 0-10 mph) and input-coupled for high vehicle speeds (according to an exemplary embodiment, 10-65 mph). In various embodiments, low vehicle speeds and high vehicle speeds may refer to different ranges of speeds. Plot 800 shows that a region of vehicle speeds when the transmission is transitioning between input-coupled mode and output-coupled mode. As described in discussion of FIG. 6, the transmission may switch from output-coupled mode to input-coupled mode when the speed of EM2 exceeds a threshold. The mode switching region of plot 800 may correspond to this threshold.

In some embodiments, the transmission may switch configurations earlier or later (i.e., stay input-coupled or output-coupled longer or shorter). For example, under high tractive demands (when throttle input is high), the vehicle may stay output-coupled longer (when vehicle speed is increasing). This may advantageously utilize the higher power available when the transmission is output-coupled. As shown in plot 800, the "shift region to maximize performance" is at the end of the mode switching region. When the vehicle is decelerating and experiencing high tractive demand, the transmission may transition to output-coupled mode earlier. As another example, under low tractive demands (when throttle input is low), the vehicle may switch from output-coupled mode to input-coupled mode early in the mode switching region (when vehicle speed is decreasing). This may advantageously accomplish a low or zero inertia shift in which EM2 speed in output-coupled mode is approximately equal to EM2 speed in input-coupled mode. When the vehicle is decelerating and experiencing low tractive demand, the transmission may transition to output-coupled mode later.

Electromagnetic Device Operations

The operations performed by electromagnetic devices EM1, EM2 may include motoring and generating. While motoring, the electromagnetic device acts as an electric motor, converting electrical energy to mechanical energy. The electromagnetic device in motoring mode may receive electrical energy from, e.g., another electromagnetic device (in generating mode), and provide rotational mechanical energy to, e.g., the transmission of a vehicle to propel the vehicle. An electromagnetic device may be motoring when it is applying torque in the same direction as its speed. While generating, the electromagnetic device acts as an electric generator, converting mechanical energy to electrical energy. The electromagnetic device in generating mode may receive rotational mechanical energy from, e.g., an internal combustion engine and provide electrical energy to, e.g., another electromagnetic device (in motoring mode). An electromagnetic device may be generating when it is applying torque in the opposite direction as its speed. Electromagnetic devices EM1 and EM2 may be configured to switch operations (i.e., from motoring to generating and generating to motoring).

Figure 9A:
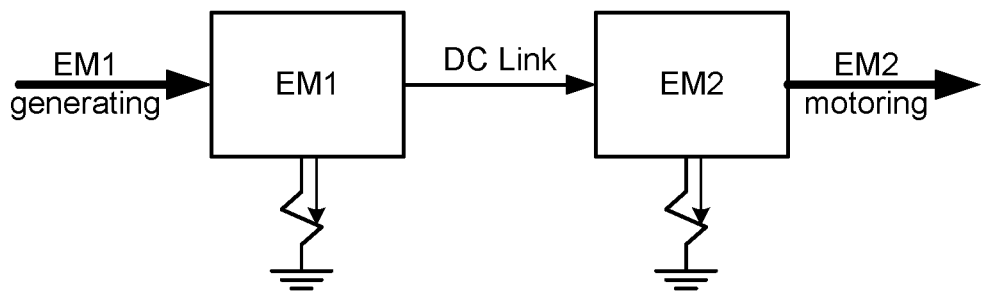
FIGS. 9A-9C are schematic diagrams of the operations of the electromagnetic devices EM1, EM2, according to exemplary embodiments.
Figure 9B:
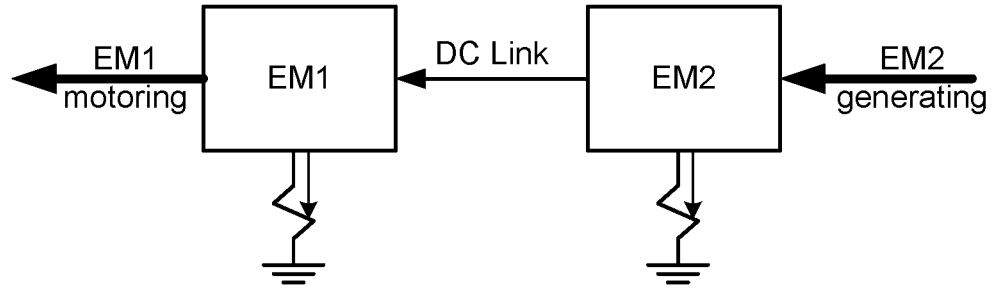
Figure 9C:
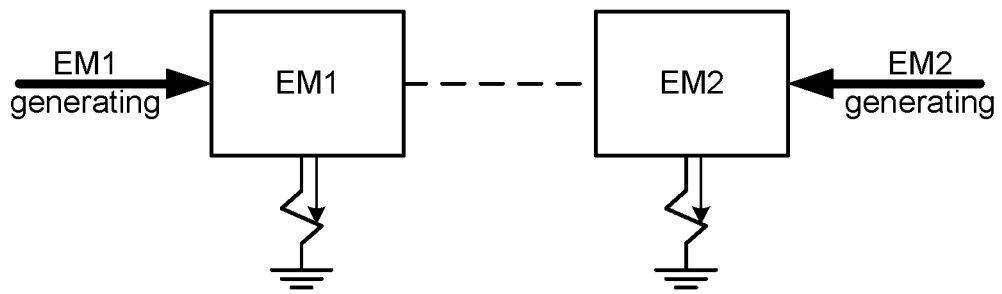

Referring to FIGS. 9A-9C, schematic diagrams of the operations of electromagnetic devices EM1, EM2 are shown, according to exemplary embodiments. FIGS. 9A-9C include a DC bus or link between EM1 and EM2. The DC bus may be considered an electrical power transmission system. According to an exemplary embodiment, EM1 or EM2 may be configured to maintain a voltage or a voltage range on the DC bus. FIGS. 9A-9C also includes the output and/or input of mechanical power, which is indicated by a thick line. FIGS. 9A-9C also include electrical power being transmitted between EM1 and EM2, which is indicated by line of medium-thickness. FIGS. 9A-9C also include electrical power losses, which are indicated by a thin line. Power losses arise from, e.g., resistance of a conducting wire, and relate to the efficiency of the electrical power path.

Referring to FIG. 9A, a schematic diagram of electromagnetic device EM1 in generating mode and EM2 in motoring mode is shown, according to an exemplary embodiment. When it is generating, EM1 may receive mechanical power input from the engine. EM1, acting as a generator, converts the mechanical power to electrical power. The voltage on the DC bus may increase when EM1 generates electrical power. EM2, acting a motor, coverts the electrical power to mechanical power. The voltage on the DC bus may decrease when EM2 uses the electrical power generated by EM1. EM2 transmits the mechanical power to the transmission to propel the vehicle. According to an exemplary embodiment, EM1 may be generating and EM2 may be motoring when the vehicle is accelerating from low vehicle speeds (i.e., when the transmission is output-coupled). When the transmission is output-coupled, EM2 is coupled to the planetary gear carrier (output) of the planetary gear set.

Referring to FIG. 9B, a schematic diagram of electromagnetic device EM2 in generating mode and EM1 in motoring mode is shown, according to an exemplary embodiment. EM2, as a generator, may receive mechanical power from the engine and covert the mechanical power to electrical power. EM1, as a motor, may convert the electrical power to mechanical power and transmit the mechanical power to the transmission of the vehicle. According to an exemplary embodiment, EM2 may be generating and EM1 may be motoring when at high vehicle speeds (i.e., when the transmission is input-coupled). EM1 is coupled to the sun gear of the planetary gear set for all vehicle speeds.

Referring to FIG. 9C, a schematic diagram of electromagnetic devices EM1 and EM2 in generating mode is shown, according to an exemplary embodiment. Both EM1 and EM2, as generators, receive mechanical power and convert it to electrical power. According to an exemplary embodiment, the power generated may compensate for losses in the electrical power path (and may not be used for, e.g., propelling the vehicle). This situation may arise when both EM1 and EM2 are at or near zero power (i.e., torque×speed=0). The vehicle may be accelerating, decelerating, or coasting when both EM1 and EM2 are generating. These conditions are represented in the plot of FIG. 18D. As shown in FIG. 18D, EM1 starts from negative power (generating) and goes through the zero power point to positive power (motoring). EM2 starts from positive power (motoring) and goes through the zero power point to positive power (generating). The crossover over point is below the zero power line, indicating that both EM1 and EM2 are generating for a period of time. In an ideal case, there was no electrical power loss. EM1 and EM2 would go through the zero power point simultaneously, and both EM1 and EM2 would never be generating at the same time. However, because there are electrical power losses, both EM1 and EM2 generate to overcome the losses.

Power Balance

According to an exemplary embodiment, the drive train of vehicle V1 may be configured to operate with electromagnetic devices EM1, EM2, and no additional sources of electrical power. Additional sources of electrical power include, e.g., a battery and other energy storage devices. Without an energy storage device, the electromagnetic devices EM1, EM2 operate in power balance. One of the electromagnetic devices may provide all of the electrical power required by the other electromagnetic device (as well as the electrical power required to offset power losses). The electromagnetic devices EM1, EM2 may operate without doing either of (a) providing electrical power to an energy storage device or (b) consuming electrical power from an energy storage device. The sum of the electrical power produced or consumed by EM1, the electrical power produced or consumed by EM1, and electrical power losses is zero. According to the embodiment of FIGS. 1 and 2, two electromagnetic devices are shown. In other embodiments, three or more electromagnetic devices may be utilized.

According to some embodiments, the drive train of vehicle V1 may include an energy storage device, e.g., a battery. In such embodiments, the battery may be charged and recharged by an electromagnetic device that is generating power. The battery may supply the electromagnetic device that is motoring the vehicle to propel the vehicle. In some embodiments, the battery may always be utilized as part of the drive train. In other embodiments, the battery may be used only when excess generated power must be stored or excess power is required to motor the vehicle. In the embodiment of vehicle V1 discussed herein, no battery is part of the drive train, and EM1 and EM2 operate in power balance.

To maintain power balance, the electromagnetic devices EM1 and EM2 may be configured to operate in torque mode or voltage mode. Torque mode and voltage mode may describe operational states of the electromagnetic devices. In torque mode, an electromagnetic device may be commanded to maintain a given torque at the input of transmission T1. The torque command may depend on the speed of the electromagnetic device in torque mode and the electrical power requested to the wheels (as described in the discussion of FIG. 16). In voltage mode, an electromagnetic device may be commanded to maintain a given voltage on the DC bus between EM1 and EM2 (as described in the discussion of FIG. 15). Equivalently, voltage mode may describe the state of an electromagnetic device configured to perform whatever operations (i.e., motoring or generating) are required to maintain power balance with the other electromagnetic device (in torque mode).

According to an exemplary embodiment, an electromagnetic device in voltage mode may be motoring or generating—whichever is required to maintain power balance with another electromagnetic device (in torque mode). For example, if EM1 and EM2 are in voltage mode and torque mode, respectively, and EM2 is motoring, then EM1 may be generating. EM1 may be generating in order to provide the electrical power demanded by EM2 as EM2 is motoring the vehicle. As another example, with EM1 and EM2 in voltage mode and torque mode, respectively, EM1 may be motoring while EM2 is generating. EM1 may be motoring in order to absorb and use the electrical power EM2 is producing. EM1 may use the electrical power to motor the vehicle.

Figures 10, 11:
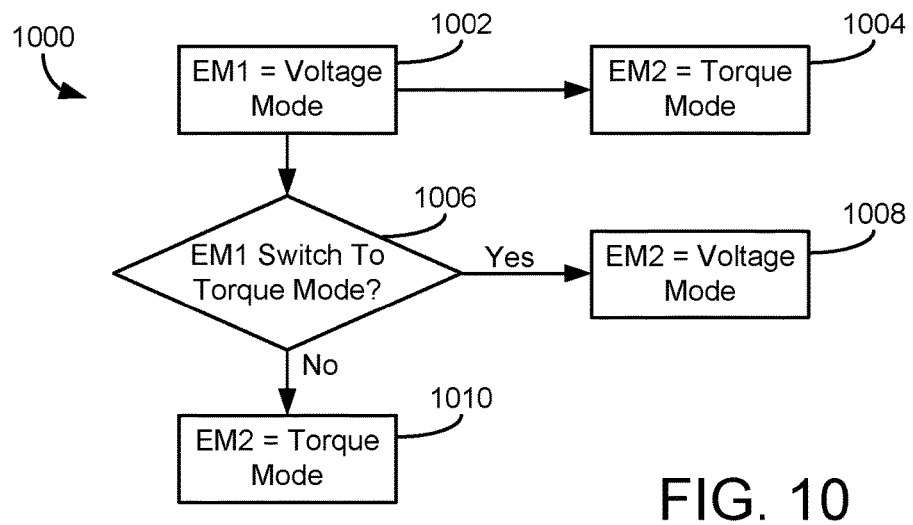
FIG. 10 is a flow diagram of a process for choosing voltage mode and torque mode for electromagnetic devices EM1 and EM2, according to an exemplary embodiment.
FIG. 11 is a chart of operational modes of electromagnetic devices EM1, EM2, according to an exemplary embodiment.

Referring to FIG. 10, a flow diagram of a process 1000 for choosing voltage mode and torque mode for electromagnetic devices EM1 and EM2 is shown, according to an exemplary embodiment. Process 1000 may choose the electromagnetic device with higher power (higher speed or higher torque or both) to be in voltage mode. Process 1000 may be carried out by a control system, such as control system 300 (FIG. 3) and/or a vehicle controller, such as vehicle controller 1902 (FIG. 19A). Though FIG. 10 may refer to a specific electromagnetic device, e.g., EM1, as operating in a particular mode, both EM1 and EM2 may be capable of operating as described below.

Process 1000 includes operating electromagnetic device EM1 in voltage mode (1002). In voltage mode, EM1 may maintain the voltage on the DC bus that connects EM1 and EM2 as discussed in the description of FIG. 15. According to an exemplary embodiment, EM1 speed when the vehicle starts (i.e., when vehicle speed is zero) may be in the range of 1200 RPM to 1800 RPM, depending on engine speed. According to some embodiments, EM1 may be in voltage mode at low vehicle speeds (i.e., when the transmission is output-coupled). In voltage mode, EM1 may be configured to generate the electrical power demanded by EM2 in motoring the vehicle.

Process 1000 includes operating electromagnetic device EM2 in torque mode (1004), when EM1 is in voltage mode.

According to some embodiments, EM2 may be in torque mode at low vehicle speeds. In torque mode, EM2 may motor the vehicle, i.e., providing rotational mechanical energy to the transmission of the vehicle to propel the vehicle.

Process 1000 includes determining whether electromagnetic device EM1 will switch from voltage mode to torque mode (1006). EM1 may switch between voltage mode and torque mode depending on the speed of the device. According to some embodiments, EM1 may be required to maintain a minimum speed when in voltage mode. A minimum speed may be necessary so that the voltage machine will generate enough electrical power to control the DC bus voltage and supply the demand of the torque machine. When the speed of EM1 falls below a threshold (approximately 1200 RPM, according to some embodiments), EM1 may not be able may not be able to generate sufficient power. At or near the threshold, EM1 may switch from voltage mode to torque mode, and EM2 may switch from torque mode to voltage mode. When EM2 switches to voltage mode, its speed may be above the threshold. Thus, EM2 may generate sufficient electrical power to control the DC bus voltage and supply EM1, which is now the torque machine.

As described in the discussion of FIG. 10, EM1 speed may fall below a threshold because EM1 speed decreases as vehicle speed increases. EM2 may have speed (in the negative direction) above the threshold when it switches from torque mode to voltage mode. According to some embodiments, EM1 may switch from voltage mode to torque mode, and EM2 may switch from torque mode to voltage mode when the vehicle is transitioning from low vehicle speeds to high vehicle speeds. EM1 may switch from torque mode to voltage mode, and EM2 may switch from voltage mode to torque mode when the vehicle is transitioning from high vehicle speeds to low vehicle speeds.

Process 1000 includes changing the mode of electromagnetic device EM2 (1008 and 1010), depending on the mode of electromagnetic device EM1. Electromagnetic device EM2 may switch modes in response to the mode of electromagnetic device EM2 to satisfy the condition that at least one (and only one) electromagnetic device is in voltage mode. If electromagnetic device EM1 switches from voltage mode to torque mode, EM2 switches from torque mode to voltage mode (1008). If electromagnetic device EM1 stays in voltage mode, then electromagnetic device EM2 remains in torque mode (1010).

Because EM2 is operating in voltage mode at high vehicle speeds, coupling electromagnetic device EM2 to engine E1 (as EM2 is when the transmission is input-coupled) may advantageously provide EM2 with a stable speed. According to an exemplary embodiment, the transmission may be switched to input-coupled mode before EM2 switches to voltage mode. This may advantageously allow for EM2 to stabilize with engine speed and prepare to operate in voltage mode.

Process 1000 describes choosing voltage mode and torque mode for electromagnetic devices EM1 and EM2 when vehicle V1 is accelerating. A similar process may occur when vehicle V1 is decelerating. According to an exemplary embodiment, at high vehicle speeds, the transmission is input-coupled, EM1 is the torque machine, and EM2 is the voltage machine. EM1 speed may be high (in a negative direction). As vehicle speed decreases, EM1 speed becomes more positive, passes through the zero speed point, and continues to increase. When EM1 speed is high enough in the positive direction (according to an exemplary embodiment, around 1200 RPM), EM1 may switch from torque mode to voltage mode, and EM2 may simultaneously switch from voltage mode to torque mode. Thereafter, the transmission may switch from input-coupled mode to output-coupled mode under the conditions described in FIGS. 6-8.

Electromagnetic devices EM1 and EM2 may be configured to switch between torque mode and voltage mode. Switching one electromagnetic device from torque mode to voltage mode and the other electromagnetic device from voltage mode to torque mode may advantageously manage the speeds of the electromagnetic devices within acceptable ranges (described in the discussion of FIG. 17, below). At a given time, EM1 may be in voltage mode and EM2 may be in torque mode. At a later time, EM1 may be in torque mode and EM2 may be in voltage mode. According to an exemplary embodiment, at least one (and only one) electromagnetic device, may be in voltage mode at any given time (either EM1 or EM2, but not both). Operating only one electromagnetic device in voltage mode at a time may advantageously avoid stacking control loops (such as process 1500 of FIG. 15) and making the DC bus unstable. At least one electromagnetic device may be in voltage mode at any time because no other energy source (e.g., a battery) is present to provide electrical energy demanded by the other electromagnetic device.

Electromagnetic devices EM1 and EM2 may be configured to switch modes simultaneously. According to an exemplary embodiment, controller area network (CAN) messaging may be implemented to allow simultaneous switching. A single CAN message may be sent to EM1 and EM2 to assign voltage mode and torque mode. Switching modes simultaneously may advantageously avoid both machines being in voltage mode at the same time. A simultaneous switch may also advantageously avoid any sudden torque changes by one or both of the electromagnetic devices.

Referring to FIG. 11, a chart 1100 of operational modes of electromagnetic devices EM1, EM2 is shown, according to an exemplary embodiment. Chart 1100 includes periods when vehicle V1 is in output-coupled mode (1102), switching between output-coupled mode and input-coupled mode (1104), and in input-coupled mode (1106). According to an exemplary embodiment, vehicle V1 may be in output-coupled mode at low vehicle speeds and in input-coupled mode when vehicle V1 at high vehicle speeds.

Chart 1100 shows that engine E1 is in speed mode for all vehicle speeds. As described in the discussion of FIG. 5, engine E1 is coupled to the ring gear G1 of planetary gear set P1. The output of planetary gear set P1 is coupled to planetary gear carrier PGC1. Thus, the engine is decoupled from the output of the transmission for all vehicle speeds. This may enable engine E1 to be advantageously commanded at a particular speed (and not a particular torque) for all vehicle speeds. The process for choosing engine speed is described in the discussion of FIG. 14. According to an exemplary embodiment, an optimum and/or fuel-efficient speed is chosen for engine speed.

Chart 1100 shows that that electromagnetic device EM1 is in voltage mode and electromagnetic device EM2 is in torque mode when vehicle V1 is output-coupled (1102). In torque mode, EM2 may be motoring the vehicle to propel the vehicle. In voltage mode, EM1 may be generating to supply the electrical energy demanded by EM2. In output-coupled mode, EM1 is coupled to sun gear G3 of planetary gear set P1 (FIGS. 2, 5). EM2 is coupled to the planetary gear carrier (output) of planetary gear set P1 (FIGS. 2, 5). Because EM2 is coupled to the output of planetary gear set P1, EM2 torque is being used to propel the vehicle, and EM2 speed increases as vehicle speed increases. Thus, the power (from EM2) being used to propel the vehicle may increase as vehicle speed increases. Because EM1 is coupled to the sun gear G1, EM1 speed decreases as vehicle speed increases. Thus, the power being generated by EM1 may decrease as vehicle speed increases. EM1 may switch to torque mode when the power being generated is too low to supply EM2 (as described in discussion of FIG. 10).

Chart 1100 shows that that EM1 is in voltage mode and EM2 is in torque mode when vehicle V1 is transitioning between output-coupled mode and input-coupled mode (1104). EM2 may be motoring in torque mode, and EM1 may be generating in voltage mode. According to an exemplary embodiment, vehicle V1 may switch from output-coupled mode to input-coupled mode before EM1 and EM2 switch between voltage mode and torque mode. The output-coupled/input-coupled transition may occur when EM2 speed reaches an upper limit (as discussed in FIG. 6). The voltage/torque transition may occur when EM1 speed reaches a lower limit (as discussed in FIG. 10). Completing the output-coupled/input-coupled transition before the voltage/torque transition may advantageously allow for EM2 to stabilize with a more steady engine speed before EM2 becomes the voltage machine.

Chart 1100 shows that EM1 is in torque mode and EM2 is in voltage mode when vehicle V1 is in input-coupled mode (1104). EM1 may be motoring in torque mode, and EM2 may be generating in voltage mode. In input-coupled mode, EM2 is coupled to engine E1. EM1 is coupled to engine E1 and the output of the planetary gear set P1. Because it is coupled to the output of the planetary gear set P1, EM1 speed increases (in the negative direction), as vehicle speed increases. EM1 speed may be reduced as EM1 speed reaches an upper limit. EM2 speed stays relatively steady because engine speed stays relatively steady. According to an exemplary embodiment, engine speed is maintained at an optimum and/or fuel-efficient speed, for all vehicle speeds. Engine speed may be increased or decreased depending on the power required (e.g., more power required to accelerate) and on speed constraints (e.g., upper limits) on EM1 and EM2. Selection of engine speed is described in the discussion of FIG. 14, below.

In some embodiments, EM1 speed and EM2 speed may be fixed when the vehicle speed and engine speed are controlled. Vehicle speed may be controlled by an operator the vehicle by providing inputs (via, e.g., an accelerator pedal) that cause the vehicle to accelerate and decelerate. Engine speed may be controlled at an optimum and/or fuel-efficient speed. EM1 speed is coupled to the engine speed and wheel speed via the planetary gear set because EM1 is coupled to the sun gear. EM1 speed may fixed when the engine speed and wheel speed are determined as a result of the kinematic constraints of the planetary gear set. When the transmission is output-coupled, EM2 speed is coupled to the wheel speed via the planetary gear set. (EM2 and output are coupled to the planetary gear carrier in output-coupled mode.) As a result EM2 speed is proportional to wheel speed. When the transmission is input-coupled, EM2 speed is coupled to the engine speed via the planetary gear set. (EM2 and engine are coupled to the ring gear in input-coupled mode). As a result, EM2 speed is proportional to the engine speed.

Referring to FIG. 12, a chart 1200 for determining whether electromagnetic devices EM1, EM2 are motoring or generating is shown, according to an exemplary embodiment. The operations represented in chart 1200 may be carried out by a control system, such as control system 300 (FIG. 3) and/or vehicle controller, such as vehicle controller 1902 (FIG. 19A). Though FIG. 12 may refer to a specific electromagnetic device, e.g., EM2, as motoring or generating, both EM1 and EM2 may be capable of operating as described below.

Chart 1200 includes whether the transmission is output-coupled or input-coupled (1202). According to an exemplary embodiment, the vehicle speeds may be low when the transmission is output-coupled and high when the transmission is input-coupled. Chart 1200 also includes the operating state of the electromagnetic device in torque mode (1204) and in voltage mode (1206). As described in the discussion of FIG. 11, EM1 may be in voltage mode and EM2 may be in torque mode when transmission T1 is output-coupled. EM1 may be in torque mode and EM2 may be in voltage mode when transmission T1 is input-coupled. According to an exemplary embodiment, electromagnetic devices EM1, EM2 may be motoring or generating. Chart 1200 also includes the conditions under which the voltage machine and torque machine operate as indicated (1208).

In motoring mode, an electromagnetic device may apply torque at its output in the same direction as its speed and may power the transmission of the vehicle to propel the vehicle. In generating mode, an electromagnetic device may apply torque at its output in the opposite direction as its speed and may generate power as required by the other electromagnetic device. Positive and negative are used indicate relative (and not absolute) directions of torque and speed. For example, the EM1 speed and torque are in the same direction when both are positive or both are negative. EM1 speed and torque are in opposite direction when one is positive and one is negative.

EM1 and EM2 may be configured to switch between motoring and generating. EM1 and EM2 may be further configured to motor and generate while in voltage mode and torque mode. Whether the electromagnetic devices EM1 and EM2 are motoring or generating may depend on whether they are in torque mode or voltage mode, and whether transmission T1 is output-coupled or input-coupled.

Chart 1200 shows that when the vehicle is accelerating in output-coupled mode, EM2 is motoring and EM1 is generating (1210). Because EM2 is motoring in torque mode, EM1, in voltage mode, may be generating to supply EM1's power demand. When EM2 is motoring, EM2 torque is in the same direction as EM2 speed. According to an exemplary embodiment, both EM2 torque and speed may be in the negative direction. When EM1 is generating, EM1 torque is in the opposite direction as EM1 speed. According to an exemplary embodiment EM1 torque may be negative and EM1 speed may be positive.

Chart 1200 shows that when the vehicle is applying torque in the direction opposite its speed in output-coupled mode, EM2 is generating, and EM1 may be motoring or generating. That is, the vehicle may be applying a braking torque. This situation may arise, e.g., when a vehicle is rolling backwards on uphill terrain. A vehicle operator may be attempting to motor the vehicle uphill. In output-coupled mode, EM2 is coupled to the transmission output. EM2 is providing a forward torque for the vehicle to move uphill. Because the vehicle is moving backwards, the speed is opposite the torque, and EM2 is generating.

When EM2 is generating in output-coupled mode, EM1 may be motoring or generating depending on whether the power generated by EM2 is greater than the overall power loss on the DC bus (1016). When the power generated by EM2 is greater than the overall power loss, EM1, in voltage mode, may be motoring. By motoring, EM1 may maintain the voltage range on the DC bus by using the power generated by EM1. When EM1 is motoring, the torque and speed of EM1 are in the same direction. When the overall power loss on the DC bus is greater than the power generated by EM2, EM1, in voltage mode, may be generating. By generating, EM1 may maintain the voltage range on the DC bus by supplementing the power generated by EM2. When EM1 is generating, the torque and speed of EM1 are in the opposite direction.

Chart 1200 shows that EM1, in torque mode, may be motoring (1214) or generating (1216) when the transmission is input-coupled. According to an exemplary embodiment, EM1 may switch from generating to motoring as vehicle speed increases. As described in the discussion of FIGS. 2 and 5, EM1 is coupled to the sun gear of the planetary gear set. As vehicle speed increases, EM1 speed decreases (i.e., becomes more negative). According to an exemplary embodiment, EM1 speed may be positive when the transmission switches from output-coupled to input-coupled mode. EM1 speed may decrease as vehicle speed increases, cross the zero speed point, and continue decreasing (i.e., becoming more negative). According to an exemplary embodiment, EM1 torque may be negative for all vehicle speeds. Thus, EM1 may switch from generating to motoring mode when EM1 speed crosses the zero speed point, from positive speed (generating) to negative speed (motoring).

EM1 is motoring (1214) when EM1 torque is in the same direction as EM1 speed. According to an exemplary embodiment, both EM1 torque and speed may be negative. When EM1 is motoring, power is flowing from the sun gear to the wheels of the vehicle. If EM1 is motoring in torque mode, EM2 may be generating in voltage mode. When EM2 is generating, EM2 torque and EM2 speed are in opposite directions. According to an exemplary embodiment, EM2 torque may be positive while EM2 speed is negative.

EM1 is generating (1216) when EM1 torque is in the opposite direction as EM1 speed. According to an exemplary embodiment, EM1 torque may be negative (as it may be for all vehicle speeds), and EM1 speed may be positive. When EM1 is generating, power is flowing to the sun gear from the engine. When EM1 is generating in torque mode, EM2 may be motoring or generating in voltage mode. EM2 may be motoring or generating depending on whether the power generated by EM1 is greater than the overall power loss on the DC bus. When the power generated by EM1 is greater than the overall power loss, EM2, in voltage mode, may be motoring. By motoring, EM2 may maintain the voltage range on the DC bus by using the power generated by EM1. When EM2 is motoring, the torque and speed of EM2 are in the same direction. When the overall power loss on the DC bus is greater than the power generated by EM1, EM2, in voltage mode, may be generating. As described in the discussion of FIG. 9C, this situation may arise when both EM1 and EM2 are at or near zero power (i.e., torque×speed=0). By generating, EM2 may maintain the voltage range on the DC bus by supplementing the power generated by EM1. When EM2 is generating, EM2 torque and EM2 speed are in opposite directions. According to an exemplary embodiment, EM2 torque may be positive and EM2 speed may be negative.

Power Device Commands

In the drive train of vehicle V1, power may flow from engine E1, to planetary gear set P1, and then to the wheels of vehicle V1 (i.e., the transmission drives one or more axles configured to provide rotational energy to the wheels to propel vehicle V1). According to an exemplary embodiment, mechanical power from engine E1 may be diverted into two paths: electrical and mechanical. From engine E1, mechanical power may take a path to ring gear G1 (coupled to engine E1), to planetary gear carrier PGC1 (coupled to the output of planetary gear set P1), and then to the wheels. From engine E1, electrical power (i.e., power that flows through electromagnetic devices EM1, EM2) may take a path to ring gear G1, to sun gear G1, to planetary gear carrier PGC1, and then to the wheels. In the electrical path, mechanical power from the engine applies a mechanical torque at the input of the generating electromagnetic device. The generator coverts the mechanical torque to electrical power. The motor converts the electrical power to a mechanical torque, which is applied to the planetary gear set and outputted to motor the vehicle.

In some embodiments, engine E1 may be the primary source of power. According to an exemplary embodiment, engine E1 may be operated particular speeds (and not particular torques) for all vehicle speeds. As described in the discussion of FIGS. 2 and 5, engine E1 is coupled to ring gear G1 of planetary gear set P1 for all vehicle speeds, while the output of planetary gear set P1 is coupled to the planetary gear carrier PGC1. This configuration may advantageously decouple engine speed from vehicle speed for all vehicle speeds. This may also may advantageously allow for selection of an engine speed that optimizes fuel economy.

At any given time, the power that is available to be delivered to the wheels of vehicle V1 may depend on the status of the system. The system status may be determined by the vehicle speed, engine speed, engine power available, coupling ratios, transmission ratios, etc. The power and torque that is delivered to the wheels may depend on the demand (i.e., throttle input). For example, with 50% throttle input, 50% of the available power may be delivered to the wheels. The available power demanded determines how much torque must be applied to the electromagnetic device in torque mode. The other electromagnetic device, in voltage mode, generates power that is available to the torque machine.

Figure 13:
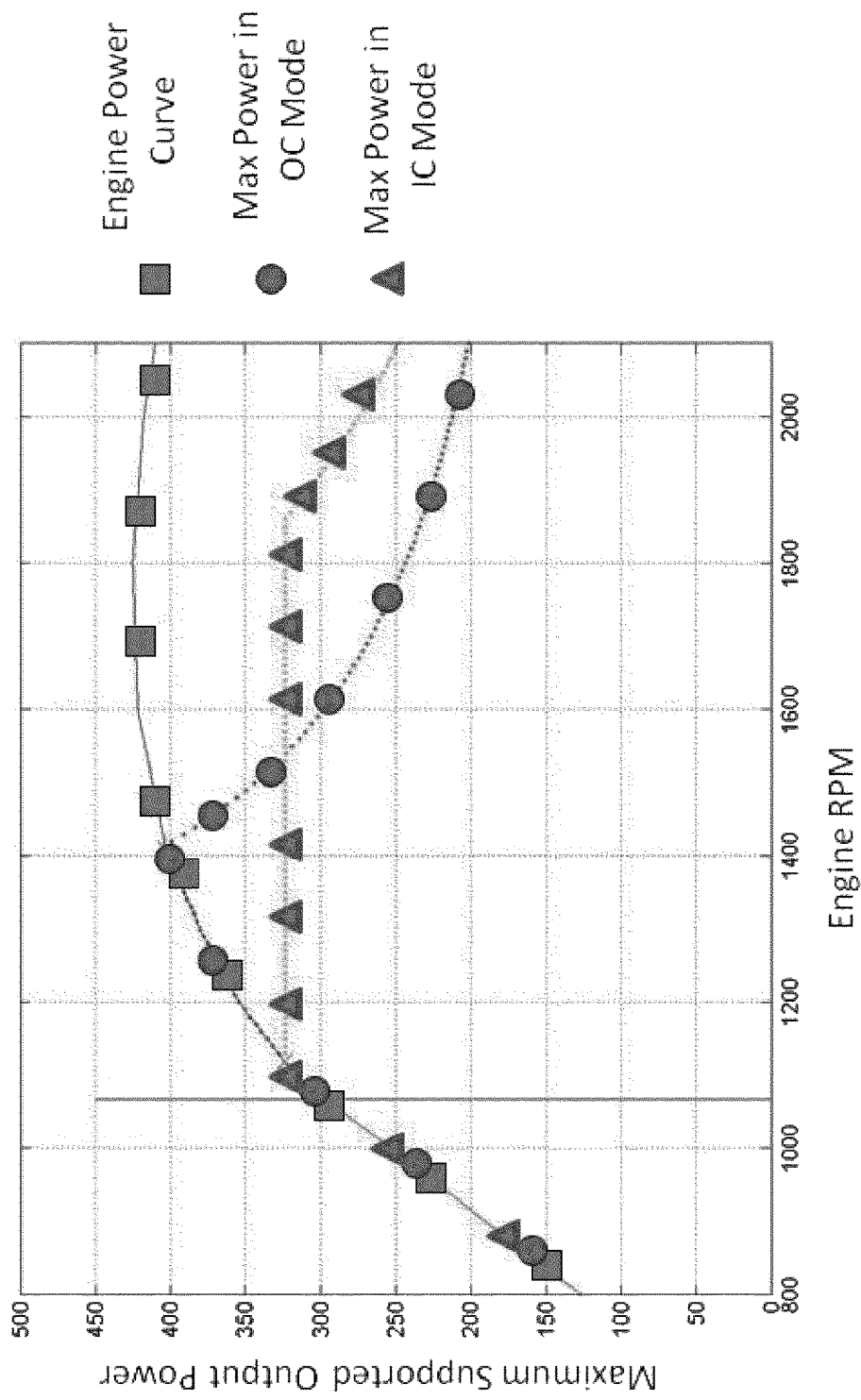
FIG. 13 is a plot of simulated output power available as function of engine speed, according to an exemplary embodiment.

Referring to FIG. 13, a plot of simulated output power available as function of engine speed is shown, according to an exemplary embodiment. The x-axis of the plot shows engine speed. The y-axis of the plot shows maximum output power available to be delivered to the wheels to drive the vehicle. According to an exemplary embodiment, the wheels of the vehicle may receive power from the output of the planetary gear carrier and EM2, depending upon transmission configuration. For example, in output-coupled mode, both the planetary gear carrier and EM2 are coupled to the axle driving the wheels, so both the planetary gear carrier and EM2 may apply torque to wheels. In some embodiments, power available may vary with vehicle speed. FIG. 13 may be considered an instantaneous representation of the power available at vehicle speed of approximately 16 mph.

According to an exemplary embodiment, engine power may not include power required to sustain accessory loads. An accessory load may be, e.g., a steering pump. Engine power may be utilized in order to operate the accessory. As a result, that engine power is not available to be delivered to the wheels of the vehicle. Powerflow controller 1904 (FIG. 19A) may be configured to compute the number and load of accessory devices, and determine the engine power available to output less accessory loads.

FIG. 13 shows the output power of the engine as engine speed increases. The engine power curve is indicated with squares. The engine power shown may represent the power that would be available to the wheels of the vehicle (except for losses) were the engine directly coupled the transmission, as in a conventional vehicle that does not utilize electromagnetic devices as part of its drive train. In some embodiments, power available may vary with the configuration of the transmission. FIG. 13 shows output-coupled power curve, which is indicated with circles, and the input-coupled power curve, which is indicated with triangles. The output-coupled and input-coupled power curves may represent the power that is available to be delivered to the wheels of the vehicle when the transmission is so configured. The transmission may be configured to switch between input-coupled and output-coupled mode at any engine speed. The configuration may be advantageously chosen at a given vehicle speed and engine speed so that, e.g., more power is available to drive the vehicle. The power available may be computed as part of calculating optimum engine speed (process 1400 of FIG. 14) and calculating the torque command for the torque machine (process 1600 of FIG. 16). Power available may be computed by powerflow controller 1904 (FIG. 19A).

FIG. 13 shows the output power of the engine (1302) for varying engine speeds. The total available power to be delivered to the wheels depends on the engine speed. As shown on the left side of the plot, power available increases as engine speed increases. According to an exemplary embodiment, both output-coupled power 1304 and input-coupled power 1306 track the maximum engine power available for low engine speeds.

In some embodiments, not all of the power that is available at a given engine speed may be outputted, due to varying transmission configurations. The transmission may not deliver all of the power available to the wheels in order to satisfy other constraints on the drive train. The constraints may include, e.g., maintaining electromagnetic devices EM1, EM2 within acceptable operating speeds. According to an exemplary embodiment, a portion of total power (i.e., power that the engine can support) delivered the output flows in the electrical path. In some embodiments, the portion of power in the electrical path is fixed. In some embodiments, the portion of power in the electrical path depends on the transmission configuration (i.e., input-coupled or output-coupled) and the ratio of wheel speed to engine speed (i.e., the ratio of electrical power to total power). In some embodiments, the portion of power in the electrical path varies based on the gear ratios of the transmission. The portion of power in the electrical path is determined by the speed and torque of the electromagnetic devices EM1, EM2. As described in the discussion of FIG. 12, EM1 speed may be determined by wheel speed and engine speed via kinematic speed constraints of the planetary gear system that the engine, EM1, and the wheels are kinematically attached to. EM2 speed is coupled to wheel speed in output-coupled mode and is coupled to engine speed in input-coupled mode. Therefore, as the wheel speed (or vehicle speed) changes, the speeds of EM1 and EM2 change. For a given vehicle speed, the power deliverable to the wheels depends on the power that can be supported by the engine and the requirement that a portion of the power flow in the electrical path. If the required portion of power in the electrical path is not available (because of the speeds and/or torques of EM1, EM2), then total power supported by the engine cannot be delivered to the wheels. As a result, the available power curve deviates (downwards) from engine power curve, as shown in input-coupled power curve and output-coupled power curve of FIG. 13.

At a given engine speed, input-coupled power 1306 may be greater than output-coupled power 1304, or output-coupled power 1304 may be greater than input-coupled power 1306. As shown near the middle of FIG. 13, output-coupled power 1304 equals maximum engine power available for a greater portion of engine speeds than input-coupled power. Thus, as described in the discussion of FIGS. 7 and 8, the transmission may advantageously remain output-coupled longer in order to provide the vehicle with more power.

Figure 14:
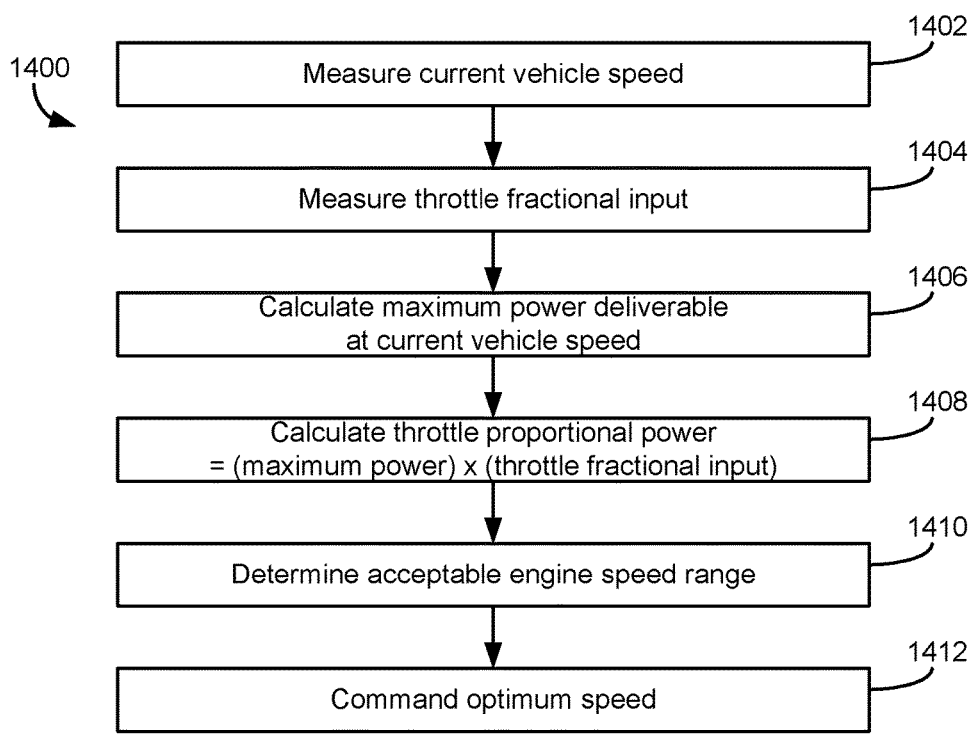
FIG. 14 is a process for calculating engine speed, according to an exemplary embodiment.

Referring to FIG. 14, a process 1400 for calculating engine speed is shown, according to an exemplary embodiment. Process 1400 may be carried out by a control system, such as control system 300 (FIG. 3) and/or vehicle controller, such as vehicle controller 1902 (FIG. 19A). In particular, engine speed may be computed by engine control module 1910 of powerflow controller 1904. According to an exemplary embodiment, engine control module 1910 may receive input from vehicle status module 1922 regarding vehicle data (e.g., current vehicle speed). Engine control module 1910 may also transmit engine control data (e.g., selected optimum engine speed), to engine 1952 of the vehicle. Engine control module 1910 may also receive data from and transmit data to other modules of powerflow controller 1902.

Process 1400 includes measuring current vehicle speed (1402). Vehicle speed may be measured by, e.g., a wheel speed sensor. Once measured, vehicle speed may be transmitted to and received by powerflow controller 1904 (FIG. 19A). For example, vehicle status module 1922 may receive vehicle speed and transmit the data to engine control module 1910.

Process 1400 includes determining throttle fractional input. In some embodiments, throttle fractional input may be measured by an accelerator input sensor. An accelerator input sensor may measure the position of the accelerator pedal. This, in turn, may determine the amount of power requested to the wheels of the vehicle. For example, a vehicle operator may request no power when the accelerator pedal is not depressed. The accelerator input may be transmitted to powerflow controller 1904 (FIG. 19A). Powerflow controller 1904 may calculate the throttle fractional input.

Process 1400 includes computing maximum power deliverable at current vehicle speed (1406). Maximum power deliverable may depend current vehicle speed and current engine speed, as depicted in the plot of FIG. 13. Maximum power deliverable may be computed by power calculation module 1920 of powerflow controller 1904.

Process 1400 includes computing throttle proportional power (1408). Throttle proportional power may be calculated by multiplying the maximum power deliverable at current vehicle speed to the throttle fractional input. Throttle proportional power describes the power requested to the wheels greater than or less than the power currently being delivered to the wheels. Throttle proportional power may be computed by powerflow controller 1904 (FIG. 19A).

Process 1400 includes determining the engine speed range that can provide the throttle proportional power (1410). The engine speed range may be a maximum speed and a minimum speed between which the required throttle proportional power can be provided. If the requested throttle proportional power is higher than the current throttle proportional power (i.e., the vehicle is accelerating), the current engine speed may be increased, if increasing engine speed will increase power deliverable. The engine speeds vs. power available data shown in FIG. 13 may be utilized to determine an acceptable engine speed range. With the acceptable engine speed, the electromagnetic device coupled to the engine may be able to generate sufficient power for the other electromagnetic device to motor the wheels at the desired vehicle speed. Engine speed range may be computed by engine control module 1910 of powerflow controller 1904 (FIG. 19A).

Process 1400 includes selecting and commanding the optimum speed from the identified range (1412). In some circumstances, the optimum speed may the lowest speed in the identified range. The lowest speed may be the most fuel-efficient speed. In other circumstances, the optimum speed may be one of the other speeds in the identified range. For example, in input-coupled mode, EM1 may approach a maximum speed in the negative direction. Because of how EM1 is coupled to engine E1, increasing engine speed may make EM1 speed more positive (less negative). Thus, an optimum engine speed that is higher than the minimum speed in the range may be chosen to advantageously maintain EM1 speed within acceptable limits.

The engine speed may be determined by engine control module 1910 of powerflow controller 1904 (FIG. 19A). The engine speed choice may depend on a variety of vehicle conditions, e.g., speed constraints on electromagnetic devices EM1, EM2. Vehicle conditions may be received at engine control module 1910 from other components of powerflow controller 1904. Speed constraints on EM1 and EM2 may be received from, e.g., power calculation module 1920. For example, the chosen engine speed may be higher than the lowest speed in the identified range if the speed of one of the electromagnetic devices EM1, EM2 is too high or too low.

According to an exemplary embodiment, engine speed may be selected so that, in combination with the vehicle speed, electrical power losses are advantageously minimized. In some embodiments, the electrical power path through transmission T1 may be less efficient than the mechanical power path. As a result, more power may be lost if there is a more power in the electrical path. The ratio of electrical power to total power is a function of the transmission ratio. Thus, the flow of electrical power may govern the flow of total power from the input to the output of the transmission. As described in FIGS. 2 and 5, EM1 is coupled to the sun gear G3 of planetary gear set P1. EM1 speed may determine the proportion of electrical power in the system. According to an exemplary embodiment, a higher EM1 speed may correspond to a greater percentage of power in the electrical path. An engine speed may be selected, that in combination with the vehicle speed, minimizes EM1 speed and electrical power losses.

According to an exemplary embodiment, an electromagnetic device in voltage mode may be operated using closed loop control on the voltage of the DC bus between electromagnetic devices EM1, EM2. The closed loop control may direct the electromagnetic device in voltage mode to maintain a voltage between a specified range. When the voltage is outside of the range, the voltage machine may act as required (i.e., generate more, generate less, consume more, or consume less) to put the voltage back into range. The closed loop control may be implemented by a control system, such as control system 300 (FIG. 3), or by EM1 command module 1912 or EM2 command module (FIG. 19A). In other embodiments, different control structures may be implemented.

Figure 15:
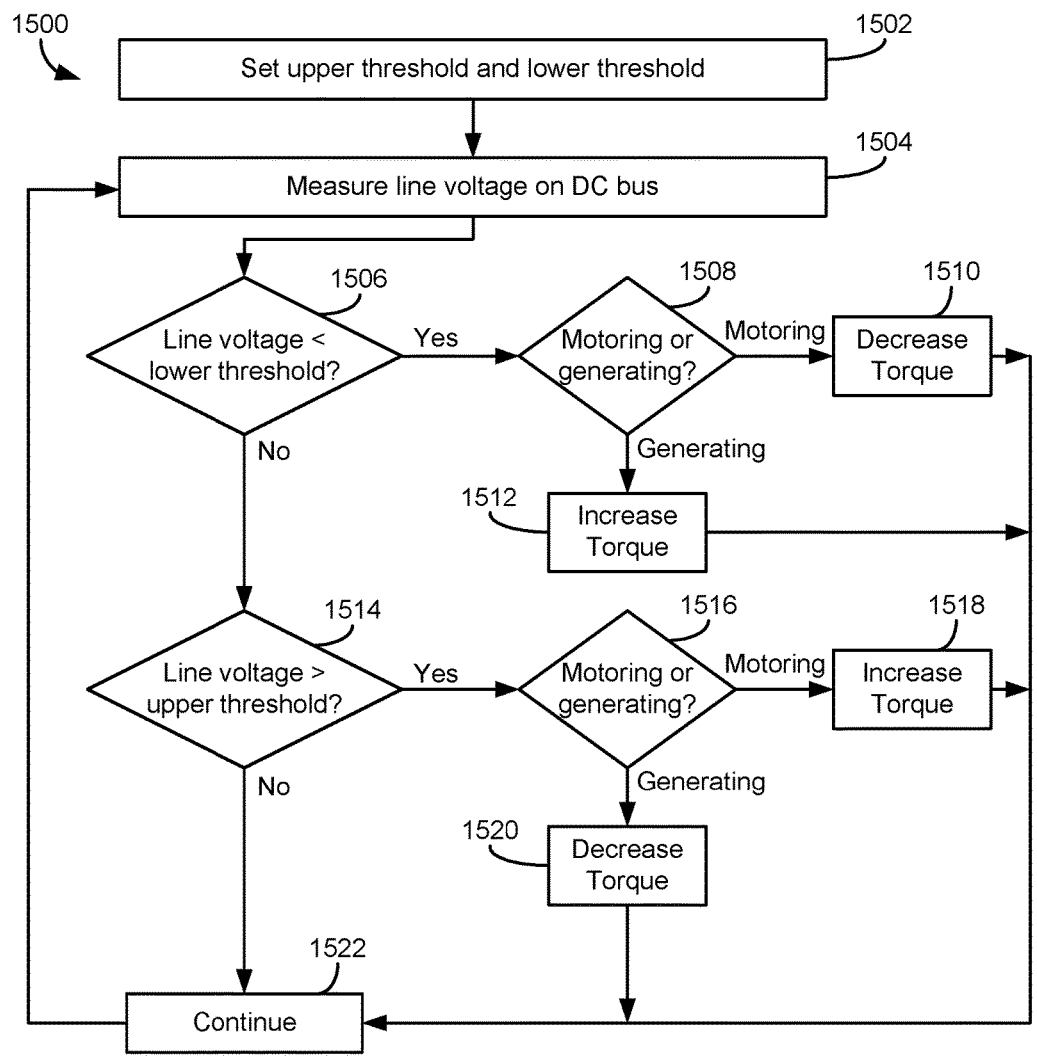
FIG. 15 is a process for operating a voltage machine using closed loop control is shown, according to an exemplary embodiment.
Figures 16, 17:
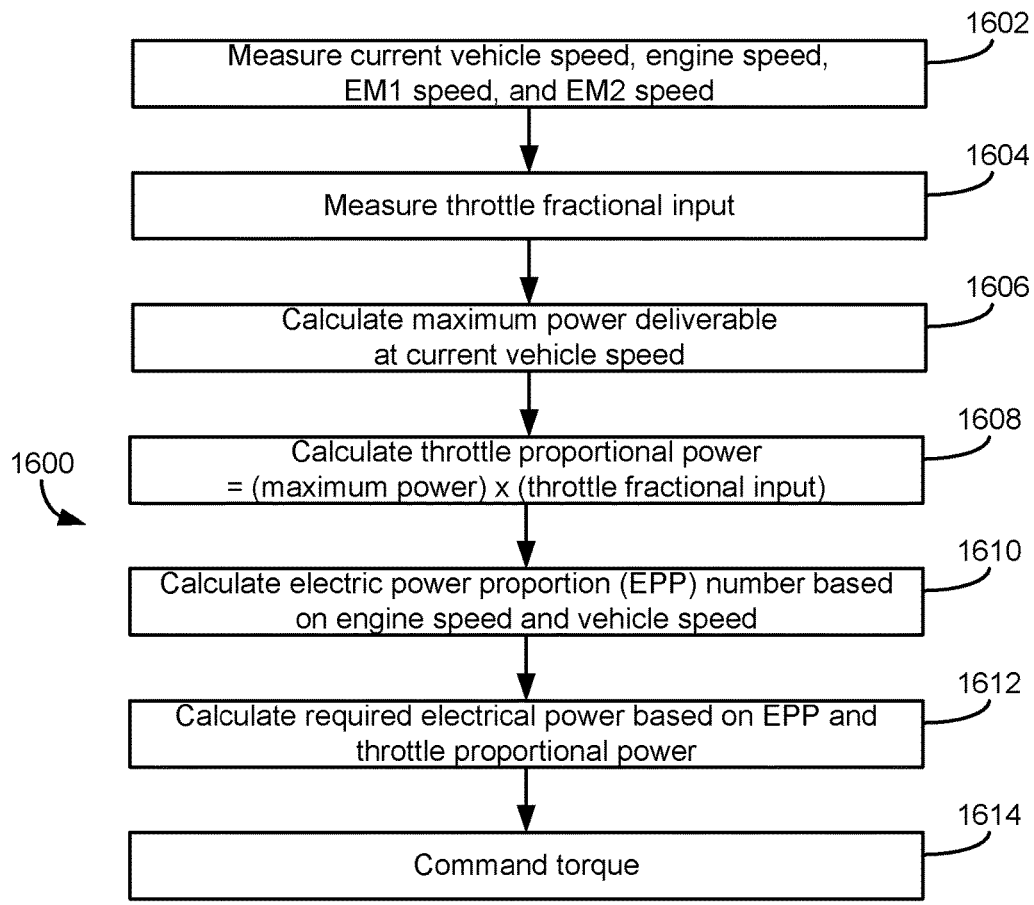
FIG. 16 is a process for determining a torque command for the electromagnetic device in torque mode, according to an exemplary embodiment.
FIG. 17 is a chart of speed constraints for engine E1, the electromagnetic device in voltage mode, and the electromagnetic device in torque mode, according to an exemplary embodiment.

Referring to FIG. 15, a process 1500 for operating a voltage machine using closed loop control is shown, according to an exemplary embodiment. Process 1500 includes setting an upper and lower threshold for the voltage on the DC bus between electromagnetic devices EM1 and EM2 (1502). In some embodiments, the upper and lower thresholds may be set by, e.g., a manufacturer of the vehicle, etc. In some embodiments, the upper and lower thresholds may be configurable by an operator of the vehicle. In some embodiments, a fixed voltage (and not a range of voltages) is commanded to the voltage machine. In other embodiments, the voltage machine may be configured to a maintain a mean value of a specified voltage range. In still other embodiments, the voltage or voltage range may be fluctuating or dynamically changing based on the status of the vehicle.

Process 1500 includes measuring the line voltage on the DC bus (1504). The voltage may be measured at different intervals. In some embodiments, voltage may be measured based on time (e.g., every two milliseconds). In other embodiments, voltage may be measured based on changes to the operating status of the vehicle and/or its components (e.g., whenever an electromagnetic device changes speed or torque by 1%, etc.). The line voltage may be measured by a sensor of one or both electromagnetic devices EM1, EM2. The sensor may transmit data to powerflow controller 1904 (FIG. 19A). The DC bus may also be configured to transmit voltage feedback to powerflow controller 1904 (FIG. 19A).

Process 1500 includes determining if the line voltage is less than the lower threshold (1506). If so, the voltage machine may be commanded to increase the DC bus voltage to above the lower threshold. The voltage machine's action may depend whether the voltage machine is motoring or generating. Thus, process 1500 includes determining if the voltage machine is motoring or generating (1508). If the voltage machine is motoring, then the voltage machine may decrease torque (1510). By decreasing its torque, the voltage machine may require less electrical power, leading to a net increase of the DC bus voltage (because the torque machine may be generating without changing torque). If the voltage machine is generating, then the voltage machine may increase torque (1512). By increasing its torque, the voltage machine may generate more electrical power, leading to a net increase of the DC bus voltage (because the torque machine may be motoring without changing torque). If the voltage machine decreases torque (1510) or increases torque (1512), the control loop may continue (1522), and the DC bus voltage may be measured again at the next interval.

When the DC bus voltage is not less than the lower threshold, process 1500 includes determining if the line voltage is greater than the upper threshold (1514). If so, the voltage machine may be commanded to decrease the DC bus voltage to below the upper threshold. As it was when the line voltage was less than the lower threshold, the action required may depend on whether the voltage machine is motoring or generating. Thus, process 1500 include determining if the voltage machine is motoring or generating (1516). If the voltage machine is motoring, then the voltage machine may increase torque (1518). By increasing its torque, the voltage machine may consume more electrical power, leading to a net decrease of the DC bus voltage (because the torque machine may be generating without changing torque). If the voltage machine is generating, then the voltage machine may decrease torque (1520). By decreasing its torque, the voltage machine may generate less electrical power, leading to a net decrease of the DC bus voltage (because the torque machine may be motoring without changing torque). If the voltage machine increases torque (1518) or decreases torque (1520), the control loop may continue (1522), and DC bus voltage may be measured again (1504) at the next interval.

Process 1500 includes continuing the DC bus control loop (1522) when the line voltage is between the upper and lower thresholds, and when the voltage machine has increased or decreased its torque to adjust to the line voltage to within range. When the DC bus control loop continues, the line voltage is measured again (1504) at the next interval. In some embodiments, the voltage machine may increase or decrease speed, as required, instead of or in addition to changing torque.

Referring to FIG. 16, a process 1600 for determining the torque command for the electromagnetic device in torque mode is shown, according to an exemplary embodiment. Process 1600 may be carried out by a control system, such as control system 300 (FIG. 3) and/or vehicle controller, such as vehicle controller 1902 (FIG. 19A). According to an exemplary embodiment, EM1 command module 1912 or EM2 command module 1914 may compute the torque command and transmit it to EM1 1954 or EM2 1956.

Process 1600 includes measuring current speeds of the vehicle, engine, EM1, and EM2 (1602). As described in the discussion of FIG. 14, vehicle speed may be measured by a vehicle speed sensor and transmitted to vehicle status module 1922 of powerflow controller 1904 (FIG. 19A). Engine speed may be measured and monitored by engine control module 1910. EM1 and EM2 speeds may be measured and monitored by EM1 command module 1912 and EM2 command module 1914. Vehicle status module 1922, engine control module 1910, EM1 command module 1912, and EM2 command module 1914 may transmit the respective speeds to the command module of the electromagnetic device in torque mode.

Process 1600 includes measuring throttle fractional input (1604), calculating maximum power deliverable (1606), and calculating throttle proportional power (1608). These steps may be completed substantially as described in process 1400 (FIG. 14). According to an exemplary embodiment, throttle fractional input may be computed by vehicle status module 1922, and maximum power deliverable and throttle proportional power may be computed by power calculation module 1920. The calculations may be transmitted to the command module of the electromagnetic device in torque mode.

Process 1600 includes calculating an electric power proportion (EPP) number (1610). The electric power proportion number may be calculated based on the engine speed and vehicle speed. In some embodiments, the EPP is a ratio of electrical power to total (i.e., electrical and mechanical) power in the system. According to an exemplary embodiment, the ratio of electrical power to total power is equal to a function of current engine speed (measured in step 1602) to current vehicle speed (measured in step 1602). The electrical to total power ratio may change when the engine speed or vehicle speed changes. The electrical power (i.e., the power from electromagnetic devices EM1, EM2) in planetary gear set may flow through the sun gear. (EM1 is coupled to the sun gear, as described in FIGS. 2 and 5). The ratio of power flowing through the sun gear to the total power flowing to the wheels of the vehicle (from the output of the planetary gear set and, in input-coupled mode, from EM2) is equal to a function of engine speed and vehicle speed. This is the result of constraints on the torques and speeds of the planetary gear set arising from gear teeth ratios. The power in the planetary gear set may be constrained when the torques and speeds are constrained. The power ratio (e.g., engine power input to planetary gear set power output, or, equivalently, power into the ring gear to power out of the carrier gear) is also constrained. The power ratio may change when the engine speed or vehicle speed changes. The ratio of electrical power to total power may vary depending on if the transmission is input-coupled or output-coupled. The ratios may differ for input-coupled mode and output-coupled mode, but the ratio of electrical power to total power is still a function of the engine speed and vehicle speed for both transmission modes.

According to an exemplary embodiment, a small electric power proportion number may be maintained to achieve efficiency. As described in the discussion of FIG. 14, more electrical power in the system may present a possibility of higher losses because the electrical power path is less efficient than the mechanical power path. According to an exemplary embodiment, power calculation module 1920 may compute the electric power proportion number.

Process 1600 includes calculating the required electrical power (1612). The required electrical power may be calculated based on the electric power proportion number (calculated in step 1604) and the throttle proportional power (calculated in step 1208). According to an exemplary embodiment, the required electrical power is calculated by multiplying the electric power proportion number and the throttle proportional power. The throttle proportional power is the total power requested by a vehicle operator. The required electrical power is the portion of the total power that will flow through electromagnetic devices EM1, EM2.

Process 1600 includes determining and commanding a torque to the torque machine (1614). The torque command may be determined by considering the required electrical power (calculated in step 1606) and the speed of the torque machine (measured in step 1602). The torque command may be computed by dividing the required electrical power by the speed. The speed of the torque machine may depend on the speed of engine E1. For example, in input-coupled mode, both EM1 and EM2 are coupled to engine E1. When the required electrical power is high, the commanded torque may also be high. According to an exemplary embodiment, the command module of the electromagnetic device in torque mode may compute the torque command. Powerflow controller 1904 may utilize a power loss estimation model to improve the torque command. A power loss estimation model may be a regression analysis completed on experimental data that allows powerflow controller 1904 to predict what the electrical power loss will be at a particular speed and torque. Using the model, the torque command can be adjusted to compensate for losses.

Referring to FIG. 17, a chart of speed constraints for the engine, the electromagnetic device in voltage mode, and the electromagnetic device in torque mode is shown, according to an exemplary embodiment. The chart of FIG. 17 shows the speed range of the engine is between an identified range (1702). The range of may be calculated in process 1400 (FIG. 14). The range at given time may represent the engine speeds that can deliver the throttle proportional power requested at that time. The engine speed range may be calculated by engine control module 1910, and a chosen engine speed may be transmitted to engine 1952 (FIG. 19A).

The chart of FIG. 17 shows the speed range of the electromagnetic device in voltage mode is above a minimum speed and below a maximum speed (1704). Electromagnetic devices EM1, EM2 may both be operated in torque mode or voltage mode. As described in FIG. 10, the electromagnetic device in voltage mode may be maintained above a minimum speed so that it may generate sufficient power to supply the power demand of the torque machine. According to an exemplary embodiment, a minimum speed may be 1200 RPM. The voltage machine may be maintained below a maximum speed in order to avoid a mechanical fault. The maximum speed may depend on the particular electromagnetic device being used and may be set by a manufacturer of the device. According to an exemplary embodiment, a maximum speed may be 6000 RPM.

The chart of FIG. 17 shows the speed range of the electromagnetic device in torque mode is below a maximum speed (1704). Like the voltage machine, the torque machine may be maintained below a maximum speed in order to avoid a mechanical fault. The maximum speed may depend on the particular electromagnetic device being used and may be set by a manufacturer of the device. According to an exemplary embodiment, a maximum speed may be 6000 RPM. In some embodiments, the torque machine may not have a minimum speed because the torque machine is not responsible for generating power to be used by another electromagnetic device.

Referring to FIGS. 18A-18D, plots of simulated operation of vehicle V1 are shown, according to exemplary embodiments. The plots of 18A-18D describe one embodiment of the general relationship of the quantities contained therein. The specific values reflected on the plots of FIGS. 18A-18D may be different in different embodiments. In some embodiments, the data depicted in FIGS. 18A-18D may be stored in memory of powerflow controller 1904 of FIG. 19A. The data may be retrieved by an operator of the vehicle, and a history of the plots shown in FIGS. 18A-18D may be created. In the embodiments of FIGS. 18A-18D, the vehicle is operated at full throttle beginning at t=10 sec.

Figure 18A:
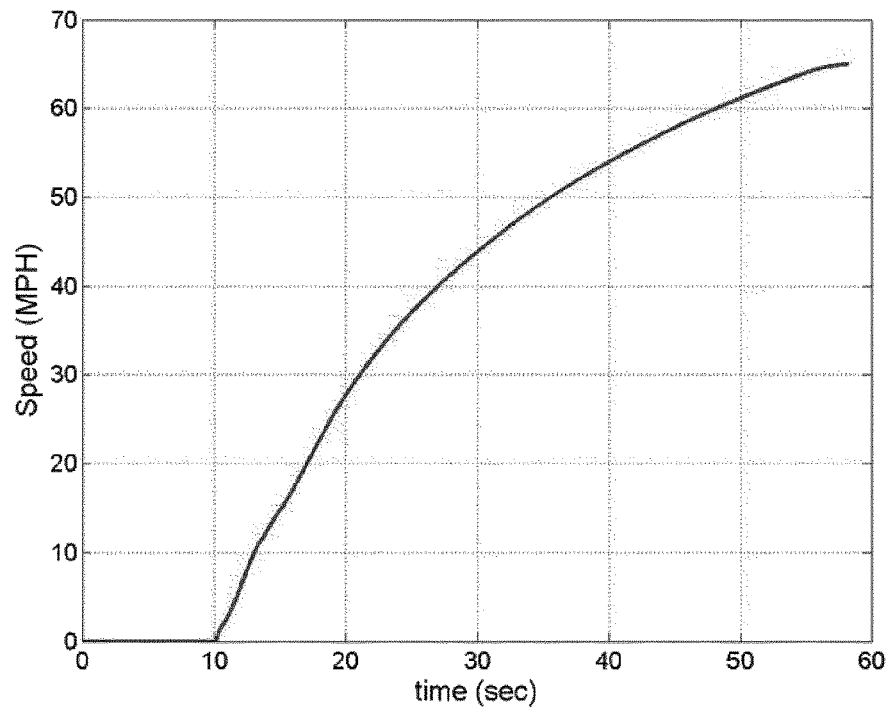
FIGS. 18A-18D are plots of simulated operation of vehicle V1, according to exemplary embodiments.

Referring to FIG. 18A, a plot of simulated vehicle speed as a function of time is shown, according to an exemplary embodiment. The plot of FIG. 18A shows that vehicle speed steadily increases, as expected, when the vehicle is operated at full throttle.

Figure 18B:
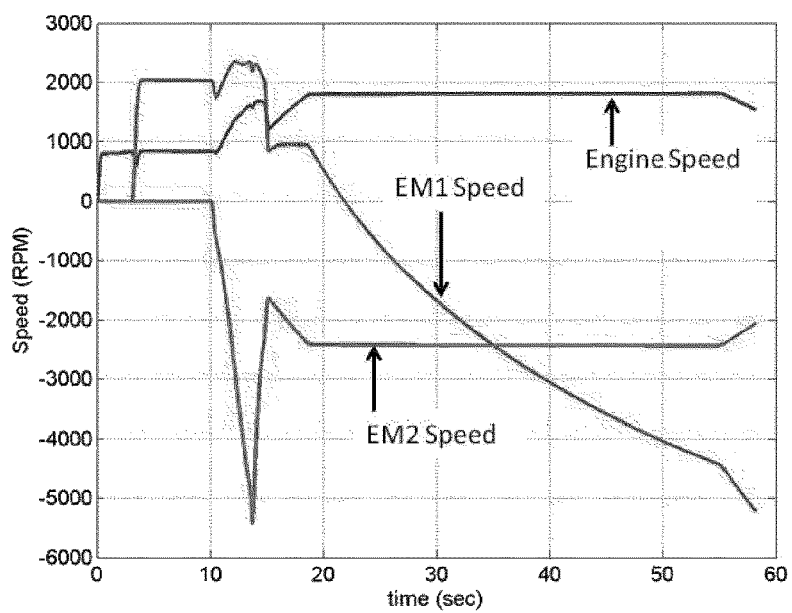

Referring to FIG. 18B, a plot of simulated engine speed and speeds of electromagnetic devices EM1, EM2 is shown, according to an exemplary embodiment. Engine speed is shown to be relatively constant for all vehicle speeds. This is expected from the coupling of the engine. As described in FIGS. 2 and 5, the engine is coupled to the ring gear G1 of planetary gear set P1. The engine is decoupled from the output of planetary gear set P1. Thus, as shown in FIG. 18B, engine speed is decoupled from vehicle speed for all vehicle speeds. According to an exemplary embodiment, the engine may be commanded at an optimum and/or fuel-efficient speed. As described in the discussion of FIG. 14, engine speed may be chosen to maintain electromagnetic devices within acceptable operating speeds. As discussed below, this is shown approximately between t=11 sec and t=15 sec.

EM2 speed is shown to increase rapidly in magnitude when the vehicle speed begins to increase. This is expected from the coupling of EM2 in output-coupled mode. As described in FIGS. 2 and 5, EM2 is coupled to the output of the planetary gear set P1 with a high gear ratio. When the EM2 speed reaches a threshold beyond which it cannot operate, the transmission switches configuration from output-coupled mode to input-coupled mode. In input-coupled mode, EM2 is coupled to the engine, which has a lower and more steady speed. As reflected in FIG. 18B, EM2 speed is shown to decrease and become more steady. According to an exemplary embodiment, EM2 may switch from torque mode to voltage mode after the transmission becomes input-coupled. As described in the discussion of FIG. 11, a more steady EM2 speed may be advantageous when EM2 is the voltage machine.

EM1 speed is shown to decrease (i.e., become more negative) as vehicle speed increases. This is expected from the coupling of EM1. As described in FIGS. 2 and 5, EM1 is coupled to the sun gear G3 of planetary gear set P1 for all vehicle speeds. As described in the discussion of FIG. 10, EM1 may switch from voltage mode to torque mode because EM1 speeds are too low to maintain a voltage on the DC bus.

EM1 speed continues to become more negative as vehicle speed increases. Early in the acceleration of the vehicle (approximately between t=11 sec and t=15 sec), engine speed is increased in order to maintain a relatively constant EM1 speed. As described in FIGS. 2 and 5, EM1 speed increases as engine speed increases. Engine speed may be increased to counteract decreasing EM1 speeds at increasing vehicle speeds.

Figure 18C:
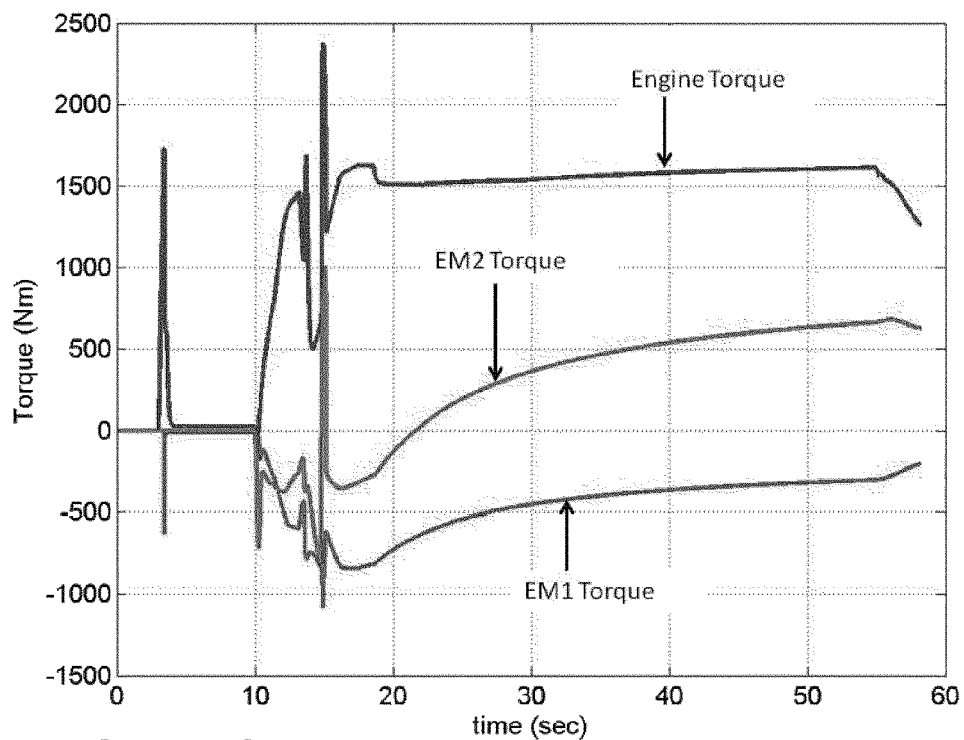
Figure 18D:
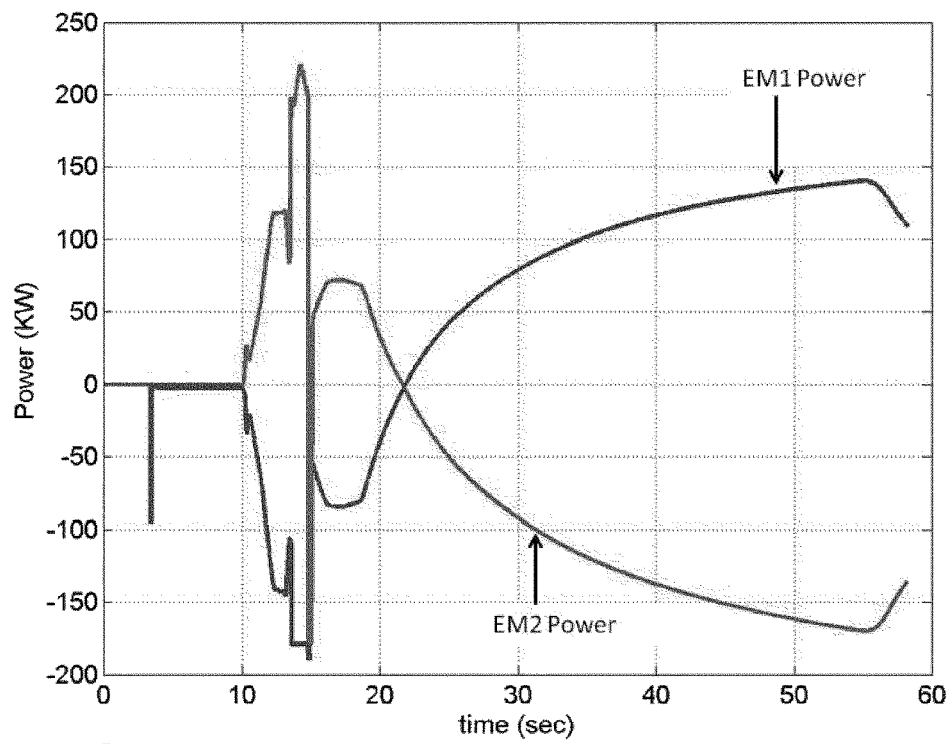

Referring to FIG. 18C, a plot of simulated engine torque and torques of the electromagnetic devices EM1, EM2 is shown, according to an exemplary embodiment. According to an exemplary embodiment, EM1 and EM2 torque may be increased or decreased in order to generate or motor with the power required for power balance. This is described in the discussion of FIG. 15.

Referring to FIG. 18D, a plot of simulated power of the electromagnetic devices EM1, EM2 is shown, according to an exemplary embodiment. EM1 power is shown to be approximately a mirror image of EM2 power across the zero power line. This is expected because EM1 and EM2 operate in power balance. As described in "Power Balance," above, at any given vehicle speed, one of the electromagnetic devices is providing the electrical power required (and only the electrical power required) by the other electromagnetic device. The sum of EM1 power and EM2 power may be approximately zero for all vehicle speeds. (Because of power losses, the sum may be not be exactly zero.) According to an exemplary embodiment, an electromagnetic device is motoring when its power is positive (i.e., its speed and torque are in the same direction). An electromagnetic device is generating when its power is negative (i.e., its speed and torque are in opposite directions).

Control Electronics

Referring to FIG. 19A, a block diagram of a vehicle controller 1902 is shown, according to an exemplary embodiment. Vehicle controller 1902 is, generally, hardware and/or software configured to control, monitor, and manage systems in a vehicle. Vehicle controller 1902 may be composed of one or more electronic control units (e.g., powerflow controller 1904). According to an exemplary embodiment, an electronic control unit may have a processing circuit, including a processing device and a memory device. Each electronic control unit may be responsible for managing one or more vehicle systems. Vehicle systems include the engine, transmission, electromagnetic devices, other devices, or any combination thereof that are capable of managing vehicle functions. In some embodiments, for example, engine and transmission control may be combined in a drive train control unit.

Vehicle controller 1902 and/or one of its component electronic control units may be configured to carry out processes required to control, monitor, and manage one or more devices in a vehicle. Vehicle controller 1902 is shown to include powerflow controller 1904, brake controller 1930, and airbag controller 1940. In FIG. 19A, vehicle controller 1902 is shown to be broken to indicate that other controllers (for, e.g., doors, emergency lights, sirens, radar, satellite communications, etc.) may be part of the vehicle controller. Vehicle controller 1902 includes a communications interface 1924 to vehicle systems 1950. In one embodiment, communications interface 1924 is a vehicle systems communications interface. Communications interface 1924 can be or include wired or wireless interfaces (e.g., jacks, antennas, transmitters, receivers, transceivers, wire terminals, etc.) for conducting data communications with, e.g., engine 1952, electromagnetic devices 1954, 1956, or others vehicle systems via a direct connection. An exemplary embodiment of data communications between vehicle controller 1902 and vehicle system 1950 is shown in FIG. 19C. Vehicle controller 1902 and/or one of its component electronic control units (e.g., powerflow controller 1904) may be configured to carry out, e.g., process 400 (FIG. 4), process 600 (FIG. 6), process 1000 (FIG. 10), process 1400 (FIG. 14), process 1500 (FIG. 15), process 1600 (FIG. 16), and other processes required to control the vehicle.

Vehicle controller 1902 includes powerflow controller 1904. Powerflow controller 1904 may be an electronic control unit responsible for controlling the systems of a vehicle drive train. Powerflow controller 1904 may be configured to measure or receive input or feedback from one or more vehicle systems and/or other electronic control units of vehicle controller 1902. Powerflow controller 1904 may be further configured to compute and output commands to one or more drive train systems. For example, powerflow controller may control an engine 1952, electromagnetic devices EM1 (1954), EM2 (1956), transmission 1958, one or more clutches 1960, throttle 1962, and shifter 1964. In other embodiments, powerflow controller may control more, fewer, and different vehicle systems.

Vehicle controller 1902 includes processing device 1906 and memory device 1908. In some embodiments, powerflow controller 1904 is a microcontroller. In other embodiments, powerflow controller 1902 is a microprocessor-based device and includes a microprocessor that executes control instructions stored in a memory. Processor 1906 can be implemented as a general purpose processor, an application specific integrated circuit (ASIC), one or more field programmable gate arrays (FPGAs), a group of processing components, or other suitable electronic processing components. Memory device 1908 (e.g., memory, memory unit, storage device, etc.) is one or more devices (e.g., RAM, ROM, Flash memory, hard disk storage, etc.) for storing data and/or computer code for completing or facilitating the various processes and modules described in the present application. Memory device 1908 may be or include volatile memory or non-volatile memory. Memory device 1908 may include database components, object code components, script components, or any other type of information structure for supporting the various activities and information structures described in the present application. According to an exemplary embodiment, memory device 1908 is communicably connected to processing device 1906.

Memory includes computer code for executing (e.g., by processing circuit and/or processor 1906) one or more processes described herein. According to an exemplary embodiment, memory 1908 is divided into modules that perform a particular function or control a particular vehicle system. Memory device 1908 includes engine control module 1910, EM1 command module 1912, EM2 command module 1914, transmission control module 1916, clutch command module 1918, power calculation module 1920, and vehicle status module 1922. The modules are described in greater detail in the discussion of FIG. 19B. According to an exemplary embodiment, one or more vehicle systems 1950 may communicate via controller area network (CAN).

Figure 19B:
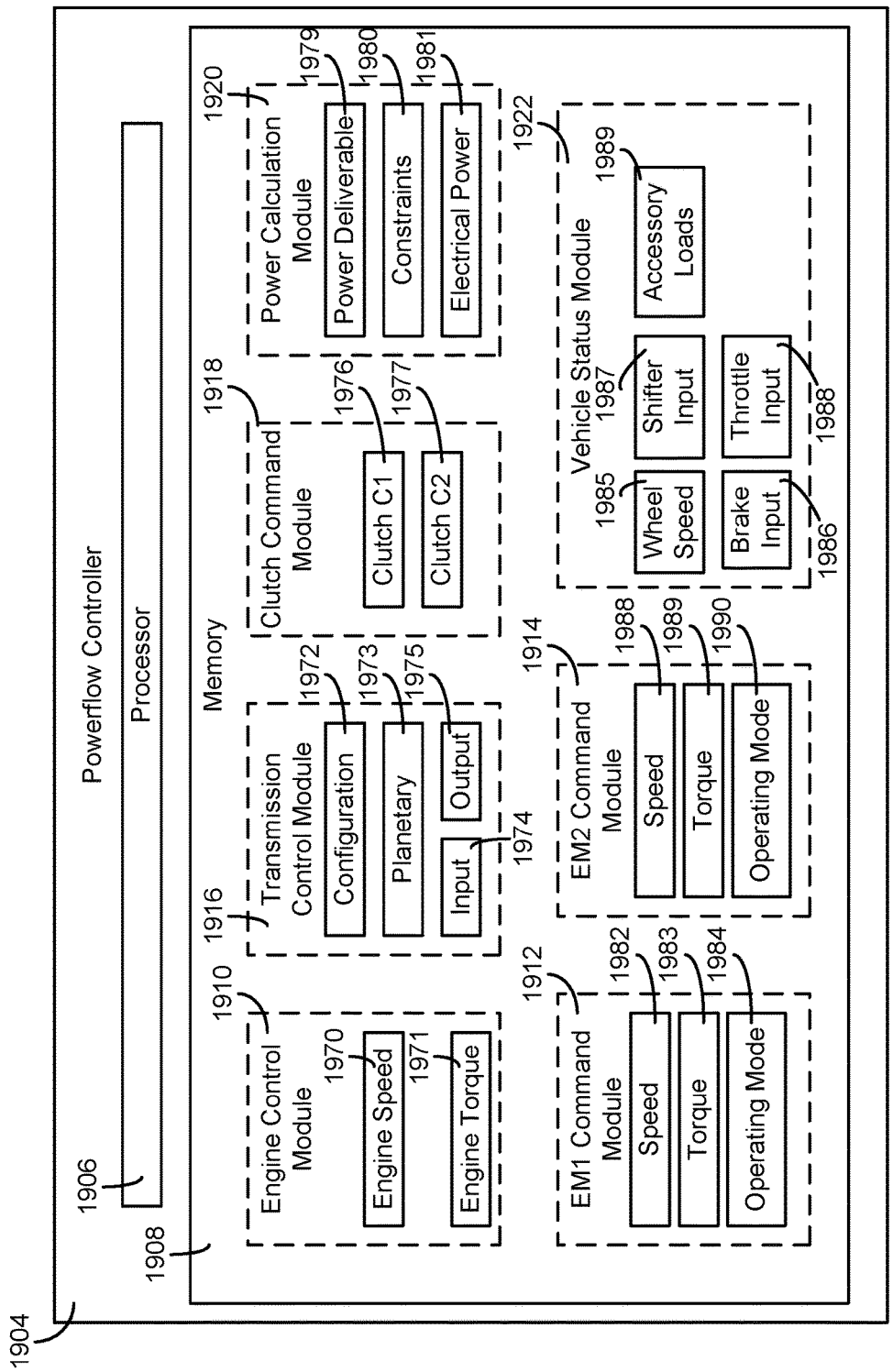
FIG. 19B is a more detailed block diagram of the powerflow controller of FIG. 19A, according to an exemplary embodiment.
Figure 19C:
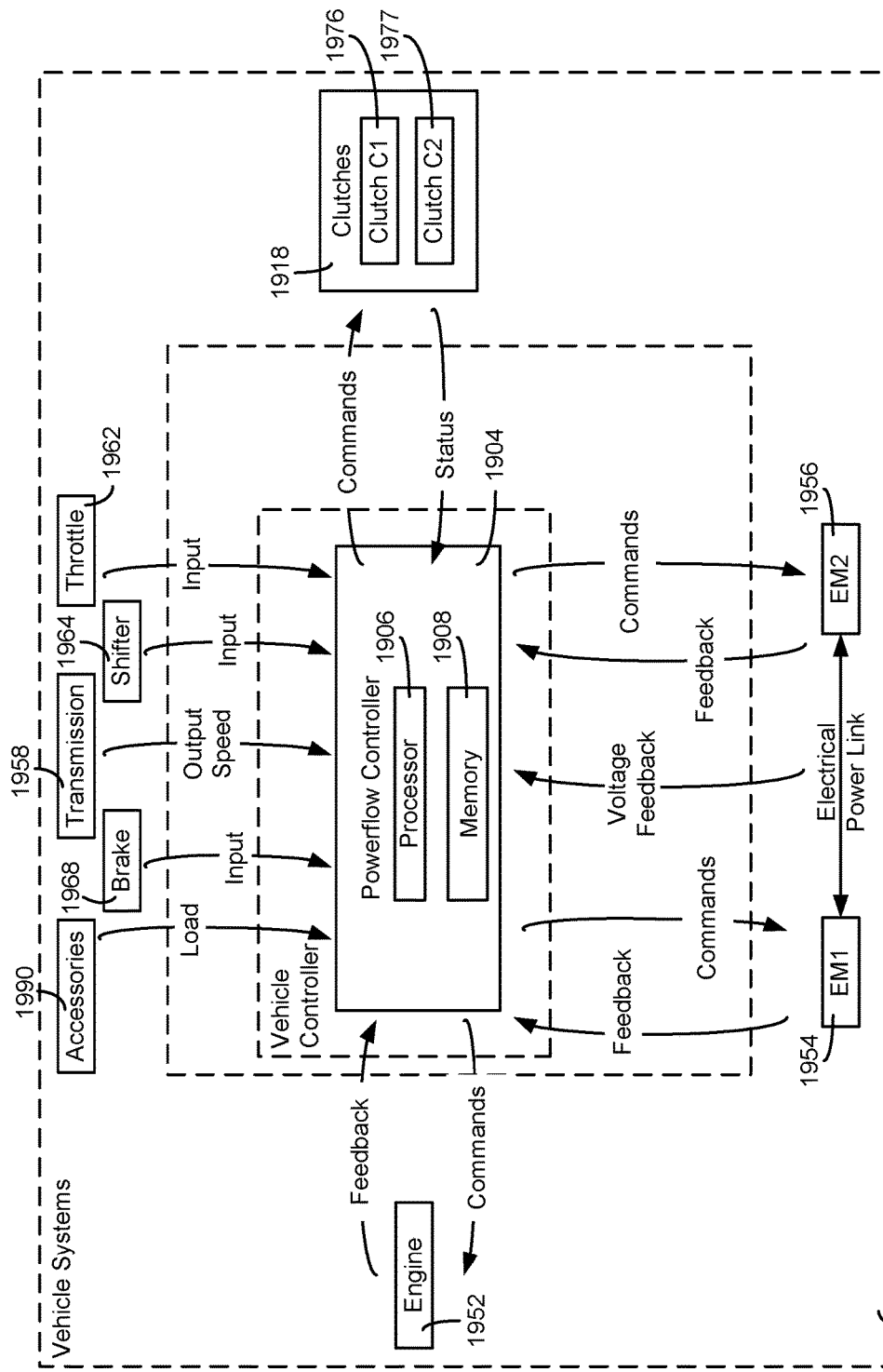
FIG. 19C is a detailed diagram of communications between the powerflow controller of FIG. 19A and certain vehicle systems, according to an exemplary embodiment.

Referring to FIG. 19B, a more detailed block diagram of powerflow controller 1904 of FIG. 19A is shown, according to an exemplary embodiment. As described in the discussion of FIG. 19A, powerflow controller 1904 includes a processing device 1906 and memory device 1908. Memory device 1908 includes vehicle status module 1918. Vehicle status module may be configured to measure and/or receive data regarding the operating status of the vehicle. Operating status may depend on input from a vehicle operator. Operating status data includes wheel speed 1985, shifter input 1987 (e.g., reverse, neutral, drive), brake input 1986, throttle input 1988 (received from, e.g., an accelerator pedal sensor), and accessory loads 1989 (power required by, e.g., a steering pump). Vehicle status module 1922 may receive input from other modules of memory 1908. In some embodiments, wheel speed may be received or measured by transmission control module and transmitted to vehicle status module 1922. In other embodiments, a wheel speed sensor of the vehicle may measure wheel speed and transmit the data to vehicle status module 1922. Vehicle status module 1922 may transmit data regarding the vehicle (e.g., wheel speed) to other modules of memory 1908.

Memory device 1908 includes transmission control module 1916. Transmission control module 1916 may be configured to compute and transmit commands for transmission 1958 (FIG. 19A). In particular, transmission control module 1916 may include instructions for computing and commanding configurations 1972. Configurations may include output-coupled mode and input-coupled mode. Transmission control module 1916 may command transmission configurations as described in the discussions of FIGS. 6-8. Transmission control module may also include planetary gear set monitoring data 1973. Planetary gear set monitoring data includes gear ratios and couplings of the components of the planetary gear set. Transmission control module also includes monitoring data from transmission input 1974 and output 1975. Input data 1974 may include torque and speed from the engine and an electromagnetic device applied to the transmission. Output data 1974 may include speed and torque output of the transmission to the wheels of the vehicle. Transmission control module 1916 may receive input from other modules of memory 1908 (e.g., vehicle status module 1922). Transmission control module 1916 may be further configured to receive feedback from transmission 1958. Feedback may include current configuration and output speed (i.e., speed delivered to the wheels of the vehicle). According to an exemplary embodiment, output speed may be used to compute the maximum power deliverable by the drive train. Transmission control module 1916 may transmit data regarding the transmission to other modules of memory 1908, including clutch command module 1918, power calculation module 1920, EM1 command module 1912, EM2 command module 1914, and engine control module 1910, etc. According to an exemplary embodiment, clutch command module 1918 may receive input regarding transmission configuration from transmission control module 1916 and issue clutch commands as necessary.

Memory device 1908 includes clutch command module 1918. Clutch command module 1918 may be configured to compute and transmit commands for clutches 1960 (FIG. 19A). Clutch system 1960 may include clutches C1, C2 of FIG. 2. In particular, clutch command module 1972 may include instructions for commanding clutch C1 (1976) and clutch C2 (1977) to be engaged or disengaged. Controlling clutch C1 and clutch C2 to be engaged or disengaged may determine if the transmission is input-coupled or output-coupled. Clutch command module 1918 may be further configured to control clutch C3 and clutch C4 (FIG. 2) to be engaged or disengaged. Clutch command module 1918 may receive input from other modules of memory 1908 (e.g., transmission control module 1916). According to an exemplary embodiment, clutch command module 1918 may receive input regarding transmission configuration from transmission control module 1916 and issue clutch commands as necessary. Clutch command module 1918 may be further configured to receive feedback from clutches 1960.

Feedback may include current configuration (e.g., engaged or disengaged). Clutch command module 1918 may transmit data regarding clutch status to other modules of memory 1908.

Memory device 1908 includes engine control module 1910. Engine control module 1910 may be configured to compute and transmit commands to engine 1952 (FIG. 19A). In particular, engine control module 1910 may include instructions for computing and commanding engine speed 1970 and engine torque 1971. Speed commands 1970 may be computed as described in the discussion of FIG. 14. Engine control module 1910 may receive input from other modules of memory 1908 (e.g., vehicle status module 1922). Engine control module 1910 may be further configured to receive feedback from engine system 1952. Feedback may include operating status (e.g., speed, torque, etc.). Engine control module 1910 may transmit data regarding engine torque and speed to other modules of memory 1908, including power calculation module 1920, transmission control module 1916, EM1 command module 1912, EM2 command module 1914, etc.

Memory device 1908 includes power calculation module 1920. Power calculation module 1920 may be configured to compute the power deliverable (1979) by the drive train at a given vehicle speed, engine speed, and transmission configuration. The power deliverable may be calculated as described in the discussion of FIG. 13. The calculated power deliverable may be used to determine the engine speed command and the torque command, as described in FIGS. 14 and 16, respectively. Power calculation module 1920 may be further configured to compute the electrical power requested from the drive train (1981). The requested electrical power may be used to compute the torque command, as described in FIG. 16. Power calculation module 1920 may also store constraints on the drive train components. For example, power calculation module 1920 may store speed constraints described in FIG. 17. Power calculation module 1910 may receive input from other modules of memory 1908 (e.g., engine speed from engine control module 910, transmission output speed from transmission control module 1916, throttle input and accessory loads from vehicle status module 1922, etc.). Power calculation module 1920 may transmit data regarding power deliverable, requested electrical power, and constraints to other modules of memory 1908. For example, power calculation module 1920 may transmit EM1 speed constraints to engine command module so, when EM1 speed approaches a threshold, the engine command module may command increased engine speed.

Memory device 1908 includes EM1 command module 1912 and EM2 command module 1914. EM1 command module 1912 and EM2 command module 1914 may be configured to compute operating parameters for the electromagnetic devices. Operating parameters include operating mode 1984 (EM1), 1990 (EM2) (e.g., voltage mode or torque mode), speed 1982 (EM1), 1988 (EM2), and torque 1983 (EM1), 1989 (EM2). According to an exemplary embodiment, a CAN message may command a particular operating mode to EM1 and EM2. This may advantageously allow for simultaneous switching of EM1 and EM2 between voltage and torque modes. A torque command for the electromagnetic device in torque mode may be calculated as described in the discussion of FIG. 16. EM1 command module 1912 and EM2 command module 1914 may receive input from other modules of memory 1908 (e.g., vehicle speed from vehicle status module 1922, electrical power required from power calculation module 1920, etc.). EM1 command module 1912 and EM2 command module 1914 may also receive feedback from EM1 system 1954 and EM2 system 1956. Feedback may include current torque and speed of the particular electromagnetic device. EM1 command module 1912 and EM2 command module 1914 may transmit data regarding operating parameters to other modules of memory 1908.

In some embodiments, EM1 command module 1912 and EM2 command module 1914 may be configured to operate EM1 and EM2 within specified speeds (as described in FIG. 17). For example, EM1 command module may transmit data to power calculation module 1920 or engine control module 1910 when EM1 speeds approach an upper threshold. Engine control module may command a higher engine speed in order to lower EM1 speed. In some embodiments, EM1 and EM2 may be connected by an electrical power link (e.g., DC bus). The electromagnetic device in voltage mode may be configured to maintain a specified voltage on the DC bus. Powerflow controller 1904 may be configured to received voltage feedback from the DC bus between EM1 and EM2. Based on the voltage feedback, EM1 command module and/or EM2 command module may increase or decrease torque or speed. This may be required to maintain power balance with the other electromagnetic device as described in the discussion of FIG. 15.

Referring to FIG. 19C, a detailed diagram of communications between powerflow controller 1904 of FIG. 19A and certain vehicle systems is shown, according to an exemplary embodiment. Communications may include input and/or feedback received by powerflow controller 1904 from vehicle systems 1950. Communications may also include commands that are transmitted by powerflow controller 1904 to vehicle systems 1950. Input and feedback data are used to compute commands for, e.g., engine 1952, clutches 1918, EM1 1954, and EM2 1956. Powerflow controller 1904 may be configured to communicate with vehicle systems 1950 via communications interface 1924 (FIG. 19A).

Powerflow controller 1904 may receive data regarding the operating status of the vehicle. Operating status data is described in step 402 of process 400 (FIG. 4). Powerflow controller may receive load data from accessories 1990 (i.e., power required to operate an accessory, and, thus, power unavailable for vehicle propulsion). Powerflow controller may receive input from brakes 1968 (e.g., proportion engaged), shifter 1964 (e.g., reverse, neutral, drive), and throttle 1968 (e.g., input proportion). Powerflow controller may also receive transmission output speed from transmission 1958. Data received from the vehicle systems 1950 may be used to compute transmission configuration (output-coupled or input-coupled), engine speed, EM1 and EM2 operating modes (torque or voltage), EM1 and EM2 speeds and/or torques, etc.

Powerflow controller 1904 may be configured to communicate with clutches 1918. Clutches 1918 may transmit current status (engaged or disengaged) to powerflow controller 1904. Based on the determination of transmission configuration (output-coupled or input-coupled), powerflow controller may command clutch C1 (1976) and/or clutch C2 (1977) to be engaged or disengaged.

Powerflow controller 1904 may be configured to communicate with engine 1952. Engine 1952 may transmit feedback regarding current operating conditions (e.g., torque and speed) to powerflow controller 1904. Based on the computation of optimum engine speed, powerflow controller may be configured to transmit engine speed commands to engine 1952.

Powerflow controller 1904 may be configured to communicate with electromagnetic devices EM1 (1954) and EM2

(1956). EM1 and EM2 may be configured to provide feedback (e.g., current torque and speed) to powerflow controller 1904. Based on the computation of electrical power requested, powerflow controller 1904 may transmit torque and voltage commands to EM1 and EM2. Powerflow controller 1904 may also be configured to receive voltage feedback from the DC bus between EM1 and EM2. Powerflow controller may use the voltage feedback to determine appropriate commands for EM1 and EM2 so that EM1 and EM2 operate in power balance.

Throughout the specification, numerous advantages of exemplary embodiments have been identified. It will be understood of course that it is possible to employ the teachings herein without necessarily achieving the same advantages. Additionally, although many features have been described in the context of a vehicle controller comprising multiple controllers and/or modules, it will be appreciated that such features could also be implemented in the context of other hardware configurations. Further, although various figures depict a series of steps which are performed sequentially, the steps shown in such figures generally need not be performed in any particular order. For example, in practice, modular programming techniques are used and therefore some of the steps may be performed essentially simultaneously. Additionally, some steps shown may be performed repetitively with particular ones of the steps being performed more frequently than others. Alternatively, it may be desirable in some situations to perform steps in a different order than shown. The teachings and methods herein may be applied to control of drive trains for a variety of vehicles, including cars, trucks, motorcycles, trains, ships, boats, aircraft, etc. The teachings and methods may have consumer, commercial, industrial, military, and other uses. Many other changes and modifications may be made to the present invention without departing from the spirit thereof.

The invention claimed is:

1. A vehicle drive comprising:
a gear set comprising a sun gear, a ring gear, and planetary gears, the planetary gears coupling the sun gear to the ring gear, wherein the planetary gears are rotatably supported by a planetary gear carrier;
a first motor/generator coupled to the gear set;
a second motor/generator at least selectively rotationally engaged with the gear set, wherein the second motor/generator is electrically coupled to the first motor/generator by an electrical power transmission system, wherein the first motor/generator and the second motor/generator are electrically coupled without an energy storage device configured to at least one of (a) provide electrical energy to the first motor/generator or the second motor/generator to power the first motor/generator or the second motor/generator and (b) be charged by electrical energy from the first motor/generator or the second motor/generator;
an engine at least selectively coupled to the gear set and selectively coupled to the second motor/generator; and
a clutch configured to selectively engage the second motor/generator to the engine.

2. The vehicle drive of claim 1, wherein the first motor/generator generates all of the electrical energy required by the second motor/generator and the electrical energy required to offset power losses.

3. The vehicle drive of claim 2, wherein the second motor/generator generates all of the electrical energy required by the first motor/generator and the electrical energy required to offset power losses.

4. The vehicle drive of claim 3, wherein the second motor/generator generates the power required by the first motor/generator when a speed of the first motor/generator is less than a threshold speed.

5. The vehicle drive of claim 1, wherein the clutch is configured to couple the second motor/generator to the engine and thereby change a configuration of the vehicle drive.

6. The vehicle drive of claim 5, wherein, in a first configuration, the second motor/generator is coupled to an output of the gear set, and wherein, in a second configuration, the second motor/generator is coupled to the engine.

7. The vehicle drive of claim 6, wherein the configuration changes when the speed of the second motor/generator is greater than a first threshold speed.

8. The vehicle drive of claim 6, wherein the configuration changes when the difference of the speed of the second motor/generator in the first configuration and the speed of the second motor/generator in the second configuration is greater than a second threshold speed.

9. The vehicle drive of claim 8, wherein the second threshold speed is a function of a fixed speed and a percentage of a throttle input.

10. The vehicle drive of claim 6, wherein the configuration changes when the difference of the speed of the second motor/generator in the first configuration and the speed of the second motor/generator in the second configuration is less than a third threshold speed.

11. A vehicle drive comprising:
a gear set comprising a sun gear, a ring gear, and planetary gears, the planetary gears coupling the sun gear to the ring gear, wherein the planetary gears are rotatably supported by a planetary gear carrier;
a first motor/generator coupled to the gear set;
a second motor/generator at least selectively rotationally engaged with the gear set, wherein the second motor/generator is electrically coupled to the first motor/generator by an electrical power transmission system, wherein the first motor/generator and the second motor/generator are electrically coupled without an energy storage device configured to at least one of (a) provide electrical energy to the first motor/generator or the second motor/generator to power the first motor/generator or the second motor/generator and (b) be charged by electrical energy from the first motor/generator or the second motor/generator;
an engine at least selectively coupled to the gear set and selectively coupled to the second motor/generator; and
a controller including a processing circuit configured to:
operate the engine at a calculated speed;
operate one of the first motor/generator and the second motor/generator at a calculated torque; and
operate the other of the first motor/generator and the second motor/generator to maintain a voltage on the electrical power transmission system.

12. The vehicle drive of claim 11, further comprising a clutch configured to selectively engage the second motor/generator to the engine, wherein the controller is configured to operate the clutch, wherein selectively engaging and disengaging the clutch changes a configuration of the vehicle drive.

13. The vehicle drive of claim 12, wherein operating the engine at the calculated speed comprises:
determining a current configuration of the vehicle drive;
measuring current speeds of the vehicle, the engine, the first motor/generator, and the second motor/generator;

calculating a maximum power that can be provided at the current engine speed;

calculating a total power requested to be provided by a vehicle operator;

calculating a range of engine speeds that can provide the total power; and operating the engine at an optimized speed, wherein the optimized speed is within the calculated range.

14. The vehicle drive of claim 12, wherein operating one of the first motor/generator and the second motor/generator at the calculated torque comprises:

determining a current configuration of the vehicle drive;

measuring current speeds of the vehicle, the engine, the first motor/generator, and the second motor/generator;

calculating a total power requested to be provided;

calculating an electrical power from the motor/generators requested to be provided;

selecting the one of the first motor/generator and the second motor/generator to provide a required torque to produce the electrical power;

calculating the required torque for providing the electrical power; and operating the selected motor/generator at the required torque.

15. The vehicle drive of claim 14, wherein operating the other of the first motor/generator and the second motor/generator comprises:

determining the current configuration of the vehicle drive;

measuring current speeds of the vehicle, the engine, the first motor/generator, and the second motor/generator;

calculating the total power requested to be provided;

calculating the electrical power from the motor/generators requested to be provided;

selecting the other of the first motor/generator and the second motor/generator to maintain a voltage on the electrical power transmission system between the second motor/generator and the first motor/generator; and operating the selected motor/generator to maintain the voltage on the electrical power transmission system.

16. The vehicle drive of claim 14, wherein calculating the total power requested to be provided comprises:

calculating a maximum power deliverable to the vehicle drive at a current vehicle speed;

measuring a proportion of throttle input of the vehicle drive; and calculating the total power requested to be provided by multiplying the maximum power deliverable and the proportion of throttle input.

17. The vehicle drive of claim 14, wherein calculating the electrical power from the motor/generators requested to be provided comprises:

calculating a ratio of the electrical power from the motor/generators to the total power, wherein the ratio is a function of engine speed and vehicle speed; and calculating the electrical power from the motor/generators by multiplying the ratio and the total power requested to be provided.

18. The vehicle drive of claim 12, wherein operating the clutch comprises:

measuring a plurality of inputs from the vehicle, wherein the plurality of inputs indicate an output power requested from the vehicle drive;

determining a desired configuration of the vehicle drive, wherein the vehicle drive in the desired configuration provides the output power requested; and selectively engaging and disengaging the clutch to configure the vehicle drive in the desired configuration.

* * * * *